United States Patent [19]

Momoi et al.

[11] Patent Number: 5,401,230
[45] Date of Patent: Mar. 28, 1995

[54] NUMERICALLY CONTROLLED MACHINE TOOL AND MACHINING METHOD THEREOF

[75] Inventors: Shoji Momoi, Gifu; Masaki Asai; Tokimasa Okumura, both of Aichi; Junji Miwa, Gifu, all of Japan

[73] Assignee: Kiwa Giken Kabushiki Kaisha, Japan

[21] Appl. No.: 846,271

[22] Filed: Mar. 2, 1992

[30] Foreign Application Priority Data

Mar. 1, 1991 [JP] Japan .................................. 3-059647
Aug. 15, 1991 [JP] Japan .................................. 3-229457
Aug. 15, 1991 [JP] Japan .................................. 3-229458
Nov. 1, 1991 [JP] Japan .................................. 3-313492

[51] Int. Cl.6 .................................................. B23B 15/00
[52] U.S. Cl. ..................................... 483/20; 29/27 C; 82/124; 82/127
[58] Field of Search ................... 29/33 P, 563, 27 C; 483/20; 82/46, 47, 48, 86, 101, 124, 127, 120; 72/405; 408/53; 409/131, 132, 138, 163, 199, 225

[56] References Cited

U.S. PATENT DOCUMENTS

Re. 33,262  7/1990  Link et al. .............................. 82/120
4,100,671  7/1978  Junike et al. ........................... 483/20
4,868,969  9/1989  Cerny ...................................... 29/558

FOREIGN PATENT DOCUMENTS 3713515  10/1987  Germany .

*Primary Examiner*—Z. R. Bilinsky
*Attorney, Agent, or Firm*—Eckert Semans Cherin & Mellott

[57] ABSTRACT

On a frame, a headstock and a tool rest are provided being free to relatively move so as to perform machining operations. The headstock is rotatably provided with spindle. The spindle is provided with a workpiece gripping means. One or more than one bar supporting means for movably supporting a bar stock in a predetermined feeding direction are provided at a predetermined position with respect to the spindle. A cutting means, for cutting the bar stock supported by the bar stock supporting means at a cutting position on the feeding direction side to the bar supporting means, is provided. A workpiece carrying means is provided being free to move relative to the headstock so as to deliver the workpiece produced by cutting of the bar stock with the cutting means to the workpiece gripping means of the spindle from the workpiece gripping means side to the spindle.

20 Claims, 25 Drawing Sheets

NUMERICALLY CONTROLLED MACHINE TOOL AND MACHINING METHOD THEREOF

BACKGROUND OF THE INVENTION

The present invention relates to a numerically controlled machine tool and machining methods thereof, whereby a long bar stock is cut into workpieces of a predetermined length, and the workpiece produced by cutting is carried to a spindle so as to machine.

One of the conventional machining methods on a bar stock is that one long bar stock is sawed with a sawing machine, whereby many workpieces of a predetermined length are produced from the bar stock, then those workpieces are loaded to a lathe by a worker. However, the work from production of workpieces (sawing of a bar stock) to machining on the workpiece in a lathe takes a long time to complete because stock control, warehousing control and goods control for a lot of workpieces are complicated.

Another conventional method of machining of a bar stock is that a bar stock is loaded from the back hand of a headstock passing through a hollow spindle with a bar feeder, the long bar stock is rotated as it is, and the portion of the bar stock, projecting into a machining area in front of the spindle, is machined, thereafter, the machined portion of the bar stock is cut off by turning. However, it is not possible that the spindle can be rotated at high speed in case of machining since a long bar stock tends to vibrate. Besides, in case of change of a kind of a bar stock, setting up, such as exchange of a filler tube in the spindle for preventing vibration, takes a long time.

A patent application No. Tokukaihei 3-111101 shows another conventional method of machining of a bar stock. That is, in this method a bar stock is supplied for the front face of a spindle without passing through the spindle and the bar stock is cut by turning so as to machine. However, in this example, it is necessary to pass a long bar stock into a hollow high rotational supporting apparatus in order to cut by turning, whereby this invention can not be flexibly applied to change of a kind (such as diameter) of a bar stock.

SUMMARY OF THE INVENTION

The object of the present invention is to provide a numerically controlled machine tool and machining methods thereof, capable of properly performing a machining on a long shaped bar stock, taking the above circumstances into consideration.

The arrangement of the present invention is that in a numerically controlled machine tool having a frame, a headstock on the frame, a spindle being rotatable on the headstock, a workpiece gripping means on the spindle and a tool rest capable of facing a workpiece gripped with the workpiece gripping means on the frame, for machining the workpiece by relative movement of the headstock and the tool rest, one or more than one bar stock supporting means for movably supporting a bar stock in a predetermined feeding direction, are provided and disposed at predetermined positions with respect to the spindle, a cutting means for cutting a bar stock supported by the bar stock supporting means in a cutting position on the feeding direction side to the bar stock supporting means is provided and a workpiece carrying means for delivering a workpiece produced by cutting of a bar stock with the cutting means to the workpiece gripping means of the spindle from the workpiece gripping means side to the spindle, are provided being free to move relative to the headstock.

With the above-mentioned arrangement, a bar stock supported by the bar stock supporting means is cut with the cutting means, whereby workpieces of a predetermined length can be produced from the long bar stock. The workpiece carrying means and the headstock are approached each other and the workpiece produced is carried to the spindle, whereby machining on the workpiece (the bar stock) can be performed with the headstock and the tool rest. Therefore, a bar stock of a big diameter can be machined and various kinds of bar stocks can be effectively properly machined. In case of machining, the short workpiece and the spindle can be rotated at high speed.

With such an arrangement that a bar stock holding means for holding a bar stock supported by the bar stock supporting means at a position corresponding to the cutting position in case where the bar stock is cut with the cutting means, is provided, the bar stock can be properly cut with the cutting means.

With such an arrangement that the bar stock holding means are provided, being free to move into a position corresponding to the cutting position in case of cutting and into a position facing the tool rest in state of holding a workpiece produced by cutting of the bar stock in case of machining, a workpiece held with the bar stock holding means can be properly machined with the tool rest.

With such an arrangement that a sawing means is provided being free to rotate, as the cutting means, so as to be able to saw a bar stock supported by the bar stock supporting means while the bar stock is held, it is not necessary to rotate the bar stock at high speed in case of cutting and therefore various bar stocks can be properly machined.

With such an arrangement that the workpiece gripping means of the spindle is attachably and detachably provided with a gripping member, a gripping member exchage means for exchanging the gripping member of the workpiece gripping means of the spindle is provided and a plurality of the bar stock supporting means are provided being free to move so as to index at a position corresponding to the feeding direction, predetermined kind of the bar stock can be automatically selected and the gripping member can be automatically exchaged according to a selected kind of the bar stock. Therefore, various bar stocks can be properly machined.

With such an arrangement that a length measuring means for measuring the length of a bar stock supported by the bar stock supporting means is provied, a data storing means for storing values of length of the bar stocks, measured by the length measuring means, is provided, and a data update means for updating the value of length of the bar stock cut, stored in the data storing means when the bar stock is cut with the cutting means, is provided, the bar stocks which length may be chaged (shortened) by cutting, can be automatically managed.

With such an arrangement that the workpiece carrying means is provided with a spindle being free to rotate, selectively facing the spindle of the headstock or the bar stock supporting means and a movement distance control means for controlling movement distance (or position) of the workpiece carrying means is provided, workpieces can be properly machined since the position of the workpiece to the spindle is properly acknowleged.

Besides, the arrangement of the present invention is that the spindle of the workpiece carrying means has a workpiece hole, the spindle of the workpiece carrying means is faced to the bar stock supporting means, a bar stock supported by the bar stock supporting means is held with the spindle of the workpiece carrying means and cut with the cutting means while the bar stock is partially inserted into the workpiece hole, whereby workpieces of a predetermined length are produced, the spindle of the workpiece carrying means is faced to the spindle of the headstock, the workpiece held with the spindle of the workpiece carrying means partially inserting into the workpiece hole, is held with the spindle of the headstock and the workpiece carrying means and the headstock are relatively moved so as to pull the workpiece out of the workpiece hole, and a portion of the workpiece projecting from the workpiece hole is machined with the tool rest.

With the arrangement metioned above, a long shaft workpiece and a bar workpiece as a workpiece produced by cutting of a bar stock can be properly machined.

DESCRIPTION OF THE PREFERRED EMBODIMENTS

Figure 1:
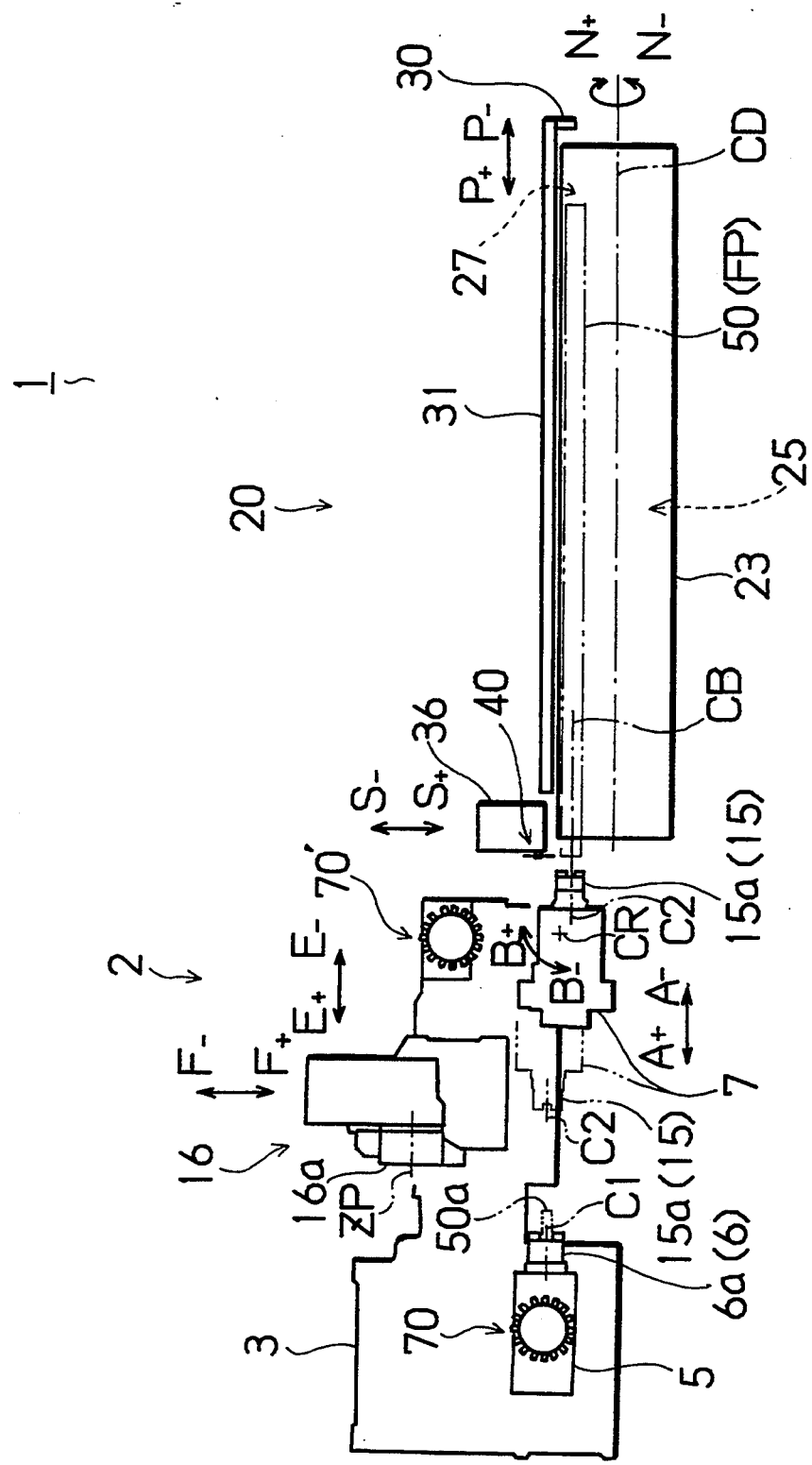
FIG. 1 is a top view of an embodiment of a numerically controlled machine tool according to the present invention.
Figure 2:
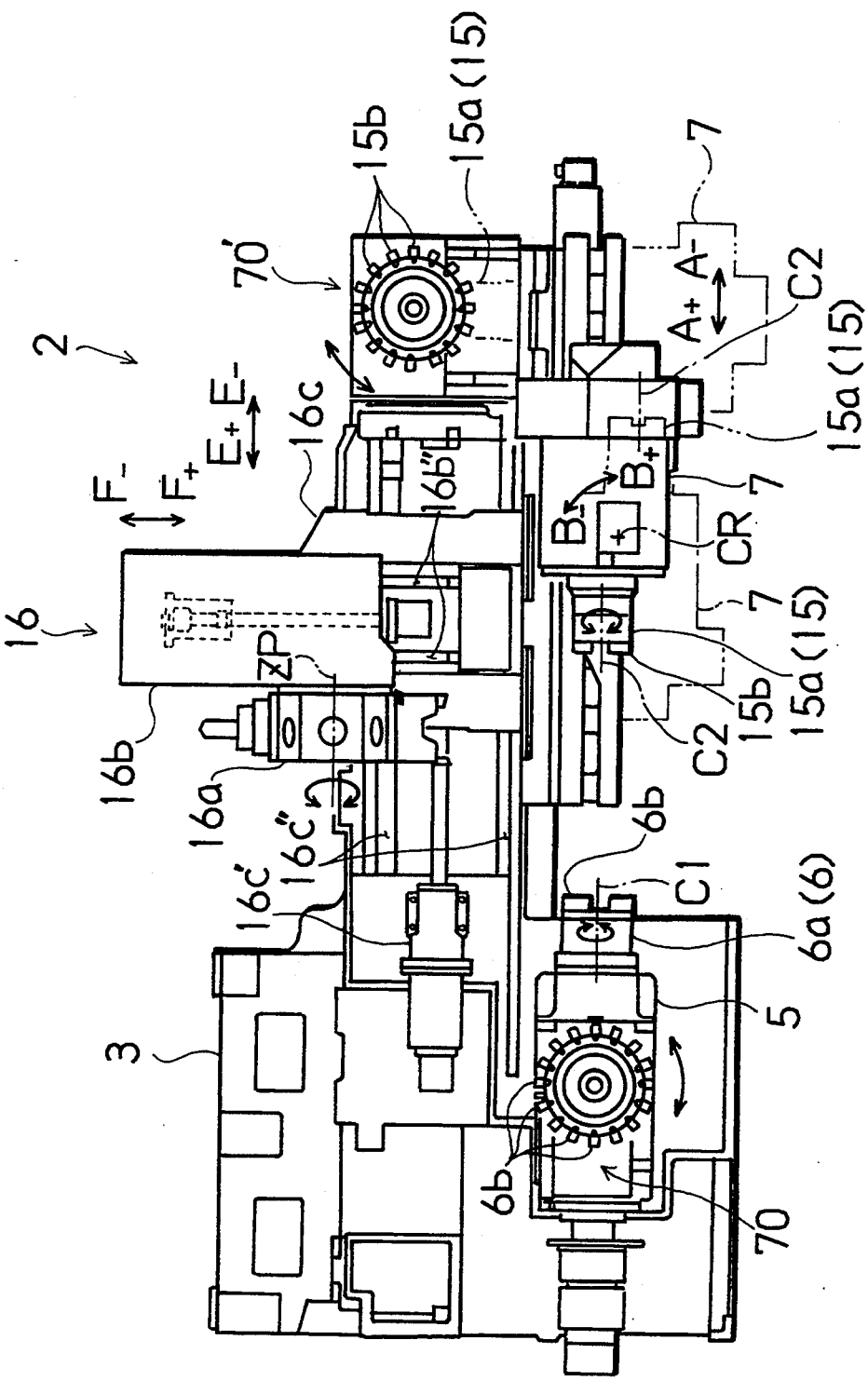
FIG. 2 is a top view showing the details of a main machine of the numerically controlled machine tool as shown in FIG. 1.
Figure 3:
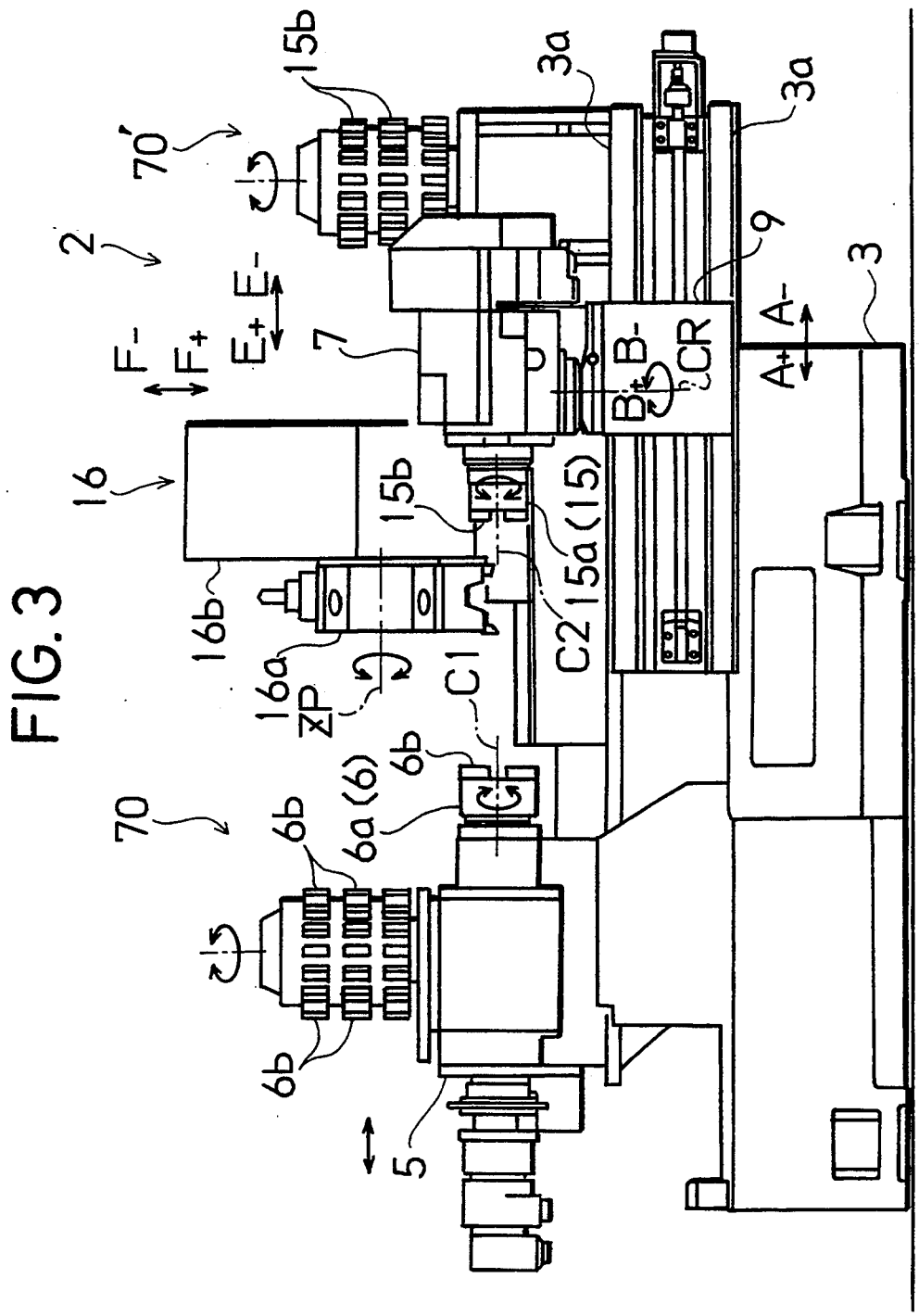
FIG. 3 is a front elevation of the main machine as shown in FIG. 2.
Figure 4:
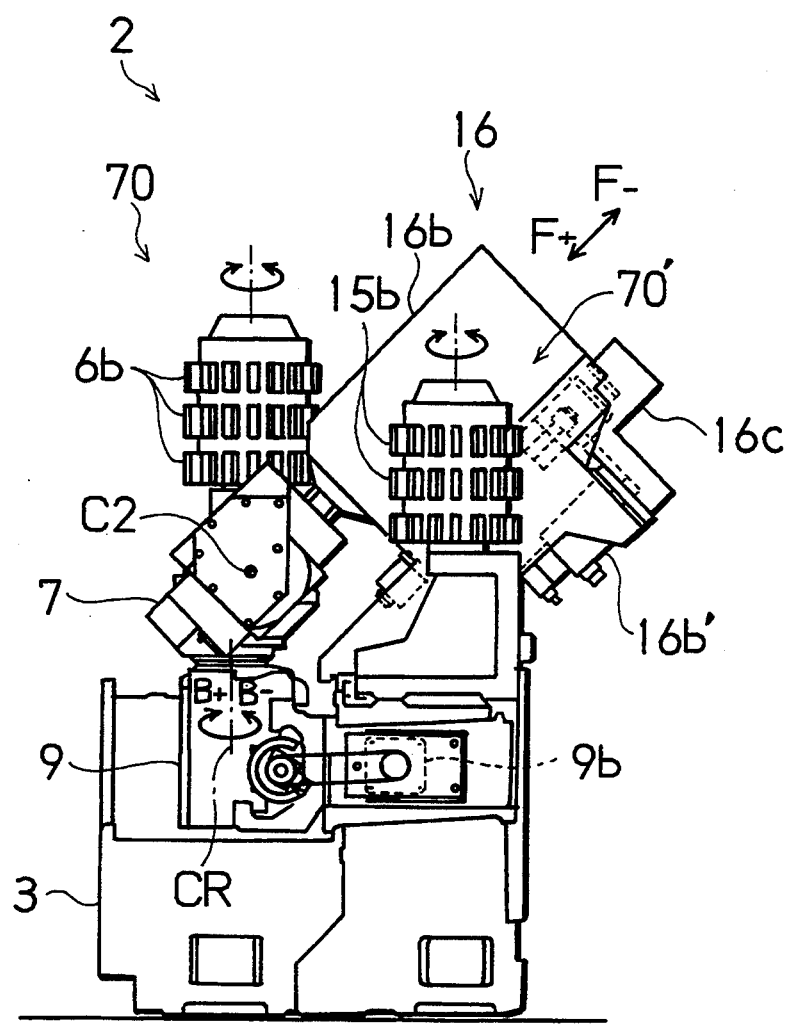
FIG. 4 is a side elevation of the main machine as shown in FIG. 2.

An opposed spindle lathe 1 has a main machine 2, as shown in FIG. 1. The main machine 2 has a base 3, as shown in FIG. 2, FIG. 3 or FIG. 4. On the left hand of the base 3 in FIG. 2, a first headstock 5 is fixedly provided.

Figure 8:
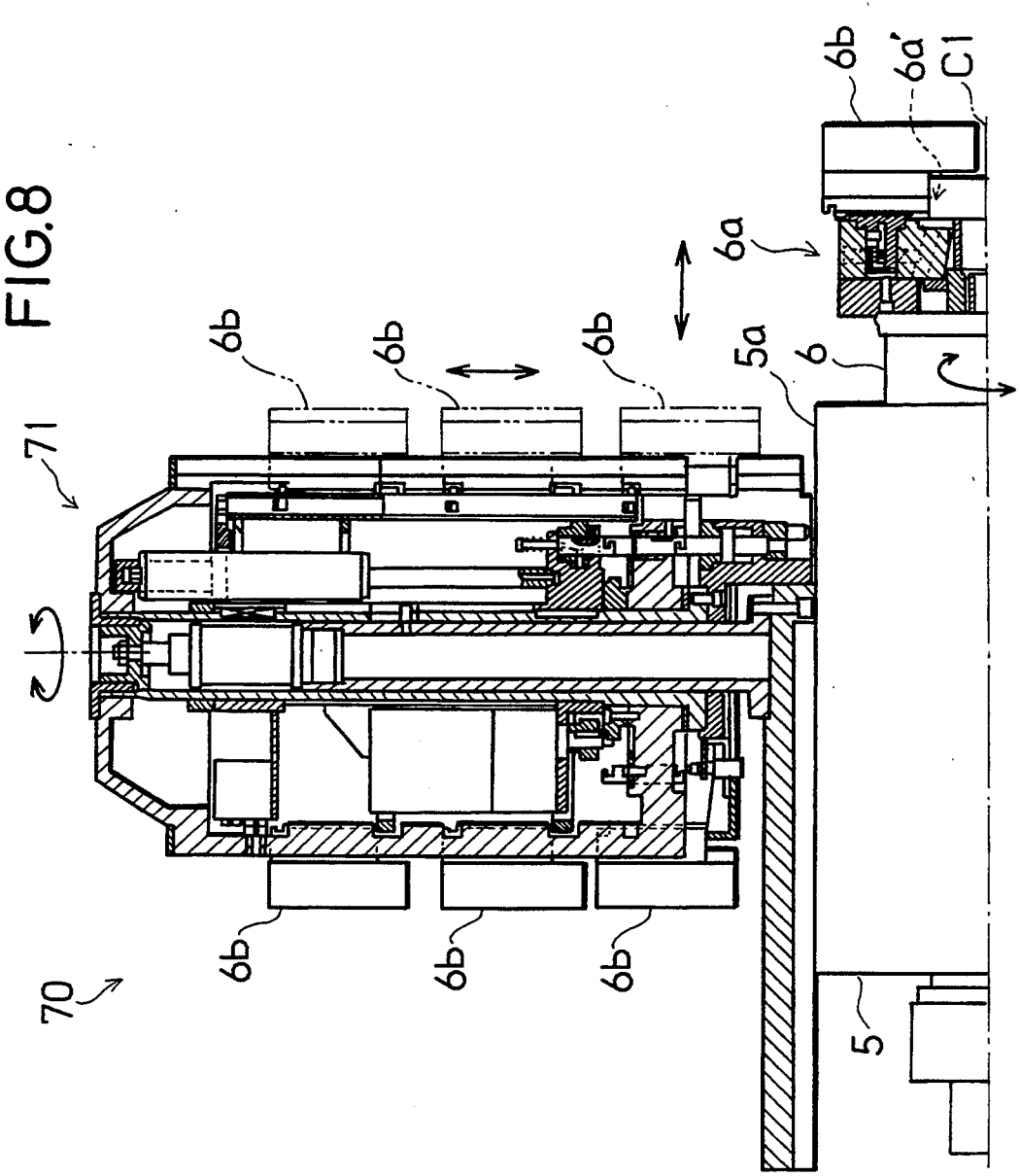
FIG. 8 is a sectional view projected from a front direction of the automatic jaw exchanger as shown in FIG. 7.

The first headstock 5 is provided with a first spindle 6 being rotatable on axis C1. On the first spindle 6, a chuck 6a is installed. At the chuck 6a, as shown in FIG. 8, a plurality of jaw grooves 6a' (the number thereof is three in this embodiment) are formed in a direction perpendicular to axis C1 (in the up and down directions in the figure). In FIG. 8, only one jaw groove 6a' is shown. In each jaw groove 6a', a jaw 6b is installed so as to insert in and pull out of the jaw groove 6a' by the motion along the jaw groove 6a' ( in the up and down directions in FIG. 8).

On an upper face 5a of the first headstock 5, an automatic jaw changer ("AJC" hereinafter) 70 is provided such that a jaw magazine 71 stores various kinds of jaws 6b and the jaw 6b of the chuck 6a can be exchanged for suitable one with respect to the kind (such as diameter and material) of a bar stock 50 (a workpiece 50a) according to the instructions of machining program PRO. The detailed explanations of the AJC 70 are in U.S. Pat. No. 4,587,708 (or European Patent Application 126,477).

On the right part of the base 3 in FIG. 2, a second headstock 7 is provided being movable in the directions of the arrows A+ and A− parallel to axis C1 of the first spindle 6 so as to approach and depart from the first headstock 5 and being rotatable up to 180 degrees in the directions of the arrows B+ and B− on axis CR perpendicular to the moving directions (in the directions of the arrows A+ and A−).

Figure 5:
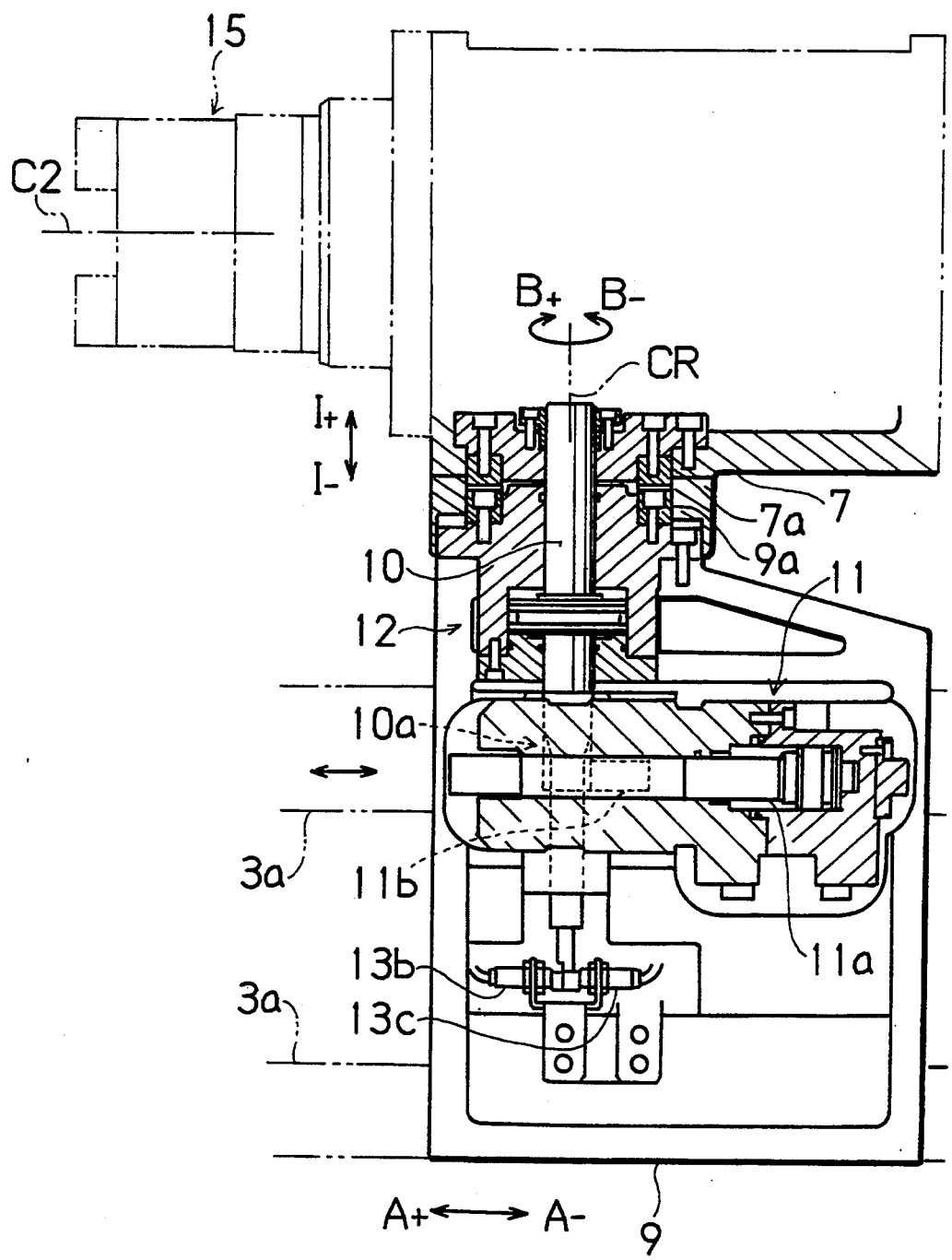
FIG. 5 is a sectional view projected from a front direction of a first headstock of the main machine as shown in FIG. 3.
Figure 6:
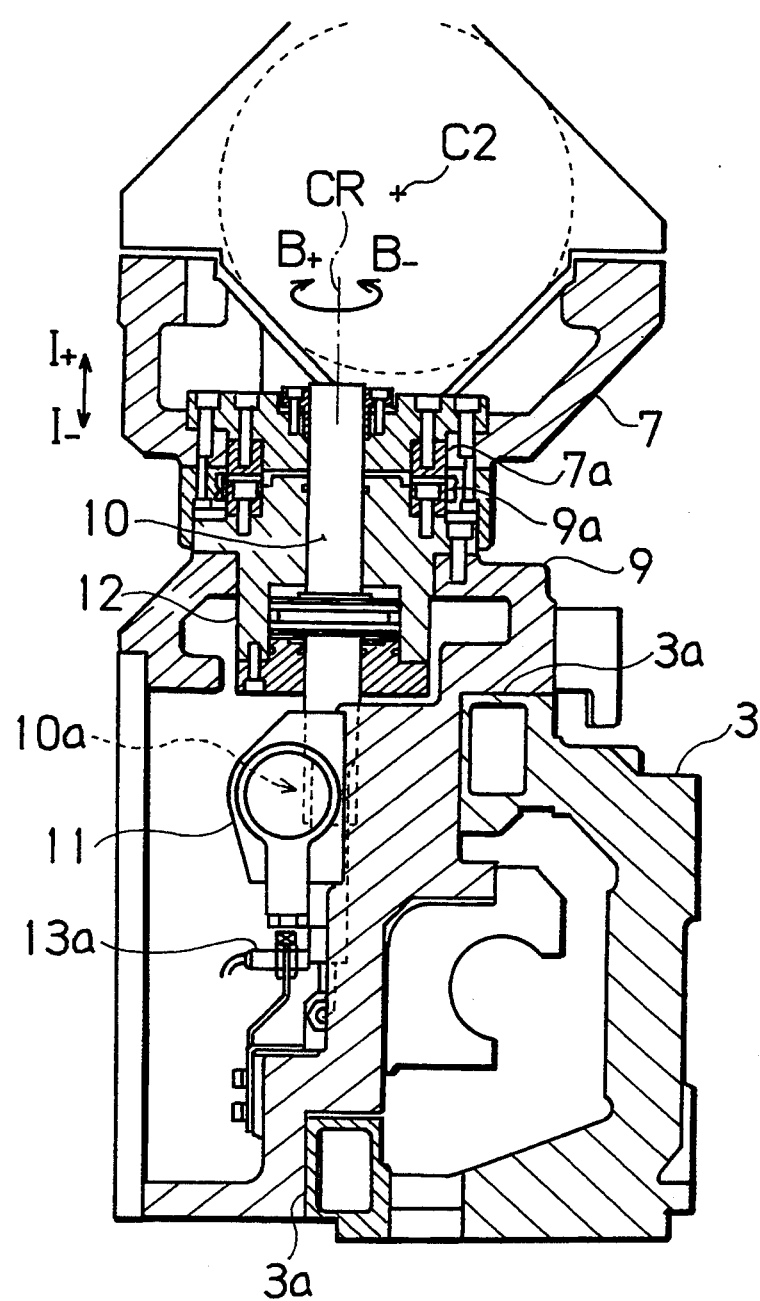
FIG. 6 is a sectional view projected from a side face direction of the first headstock as shown in FIG. 5.
Figure 7:
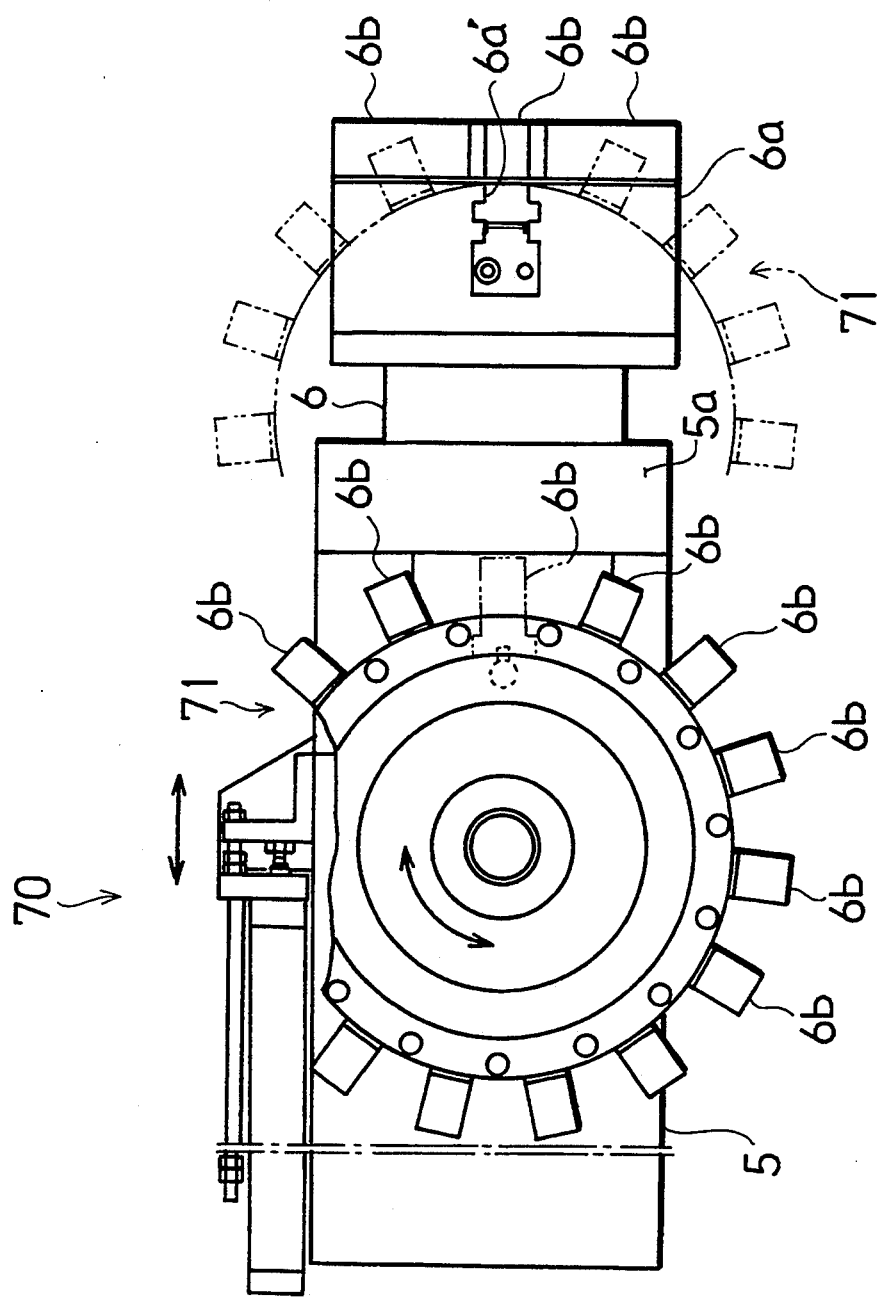
FIG. 7 is a top view showing the details of an automatic jaw exchanger of the main machine as shown in FIG. 2.

On the base 3, a carriage 9 is provided being movable in the directions of the arrows A+ and A− through guides 3a in FIG. 3 and a motor 9b in FIG. 4. On the carriage 9, as shown in FIG. 5, the second headstock 7 is provided being fixed on a mounting shaft 10. The mounting shaft 10 is provided being able to lift up and down in the directions of the arrows I+ and I− parallel to axis CR so as to engage and remove a fixing member 9a of the carriage 9 and a fixing member 7a of the second headstock 7 with and from each other through a hydraulic cylinder or an air cylinder ("the cylinder" hereinafter) 12 and being able to rotate in the directions of the arrows B+ and B− on axis CR through a cylinder 11, a piston rod 11a, a rack 11b and a pinion gear 10a. The carriage 9 is provided with sensors 13a, 13b and 13c for detecting the lifting position or the rotating position of the mounting shaft 10 in the directions of the arrows I+ and I− or in the directions of the arrows B+ and B−, as shown in FIG. 6 or FIG. 5.

The second headstock 7 is provided with a second spindle 15 being rotatable on axis C2 perpendicular to axis CR, as shown in FIG. 2. Axis C2 of the second spindle 15 is disposed so as to selectively match with axis C1 of the first spindle 6 or axis CB of the bar stock 50, stored in a guide pocket 27 indexed at a feeding position FP of a bar supplier 20, described hereinafter, by the rotation of the second headstock. 7 in the directions of the arrows B+ and B−. On the second spindle 15, a chuck 15a is installed and on the chuck 15a, a plurality of jaws 15b are attachably and detachably installed, the same as the chuck 6a of the first spindle 6.

On the upper portion of the base 3 in FIG. 2, an AJC 70' having similar constitution to the AJC70, is provided so as to face the chuck 15a of the second spindle 15 by the movement or rotation of the second headstock 7 in the directions of the arrows A+ and A− or in the directions of the arrows B+ and B−. The AJC 70' stores various kinds of jaws 15b.

Between the first headstock 5 and the second headstock 7 on the base 3, a tool rest 16 is provided being movable in the directions of the arrows E+ and E− parallel to axis C1 of the first spindle 6 through a carriage 16c, a motor 16c' and a guide 16c" and in the directions of the arrows F+ and F− in FIG. 2, perpendicular to axis C1 through a slide 16b, a motor 16b' as shown in FIG. 4 and a guide 16b".

On the slide 16b, a turret 16a is provided being rotatable on axis ZP parallel to axis C1 of the first spindle 6. On the turret 16a, a plurality of tool installation positions are circumferentially provided on axis ZP so as to be indexed by the rotation of the turret 16a. At each tool installation position, a turning tool, an end mill or the like is installed.

The opposed spindle lathe 1 has the bar supplier 20, which is disposed on the right hand of the main machine 2 of FIG. 1. The bar supplier 20 stores various kinds of bar stocks 50.

Figure 9:
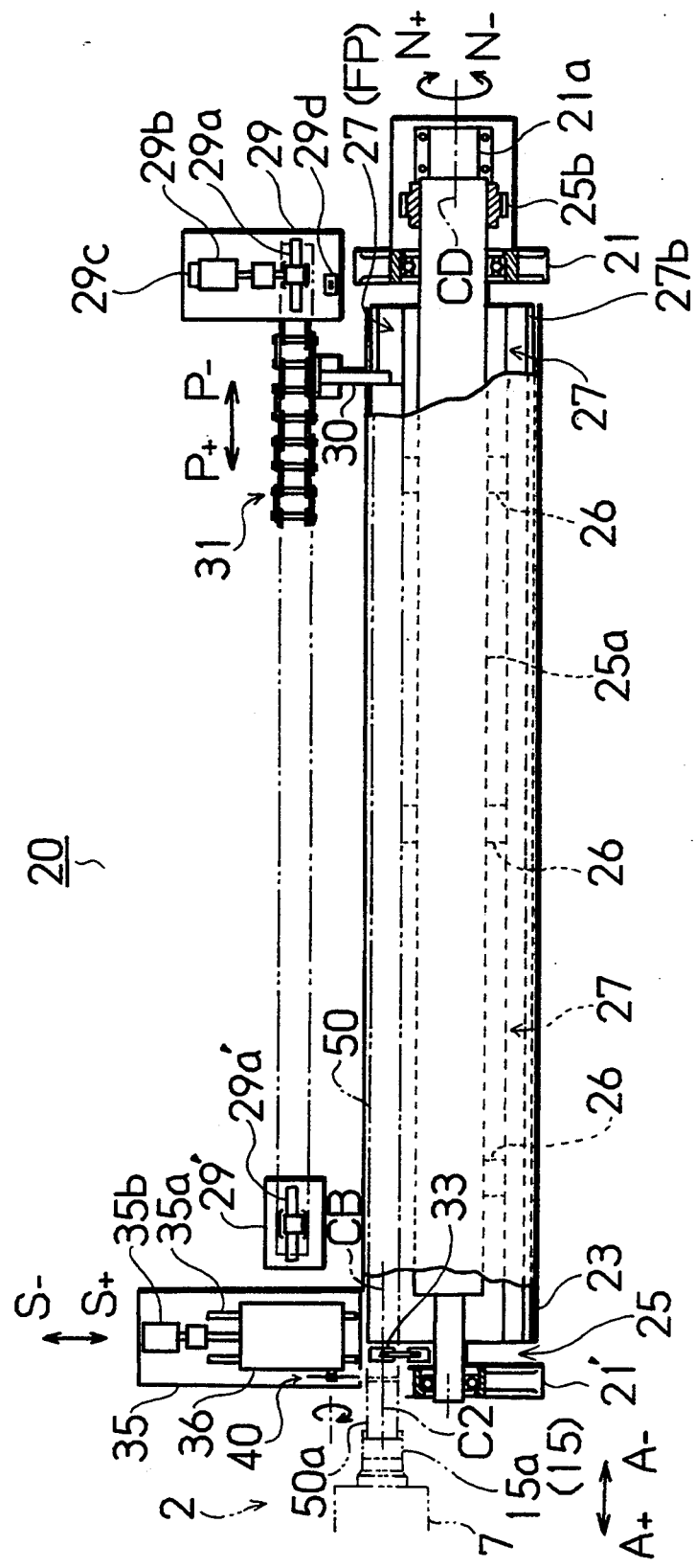
FIG. 9 is a top view showing the details of a bar supplier of the numerically controlled machine tool as shown in FIG. 1.
Figure 10:
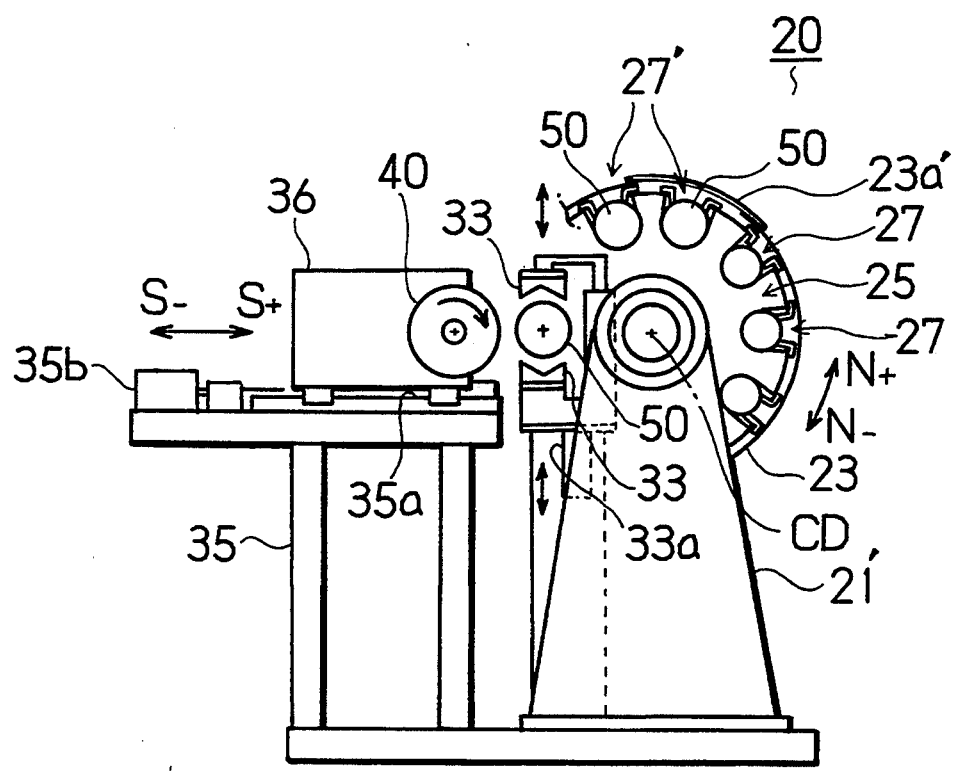
FIG. 10 is a side elevation of the bar supplier as shown in FIG. 9.
Figure 12:
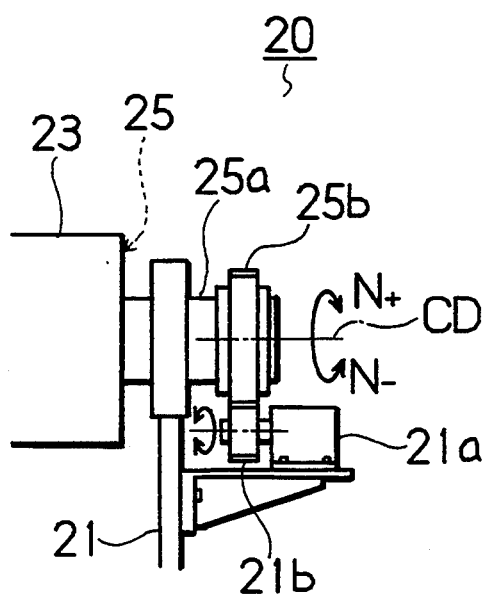
FIG. 12 is a front elevation showing rolling mechanism of the storage drum of the bar supplier as shown in FIG. 9.

The bar supplier 20 is provided with a drum 25 being rotatable in the directions of the arrows N+ and N− on axis CD parallel to the movement direction of the second headstock 7 (in the directions of the arrows A+ and A−) through supporting bases 21, 21', a motor 21a, gears 21b, 25b, and rotating shaft 25a, as shown in FIG. 9, FIG. 10 or FIG. 12. The rotating shaft 25a is supported through the supporting bases 21 and 21'. The rotating shaft 25a is connected with the motor 21a through the gears 21b and 25b.

Figure 11:
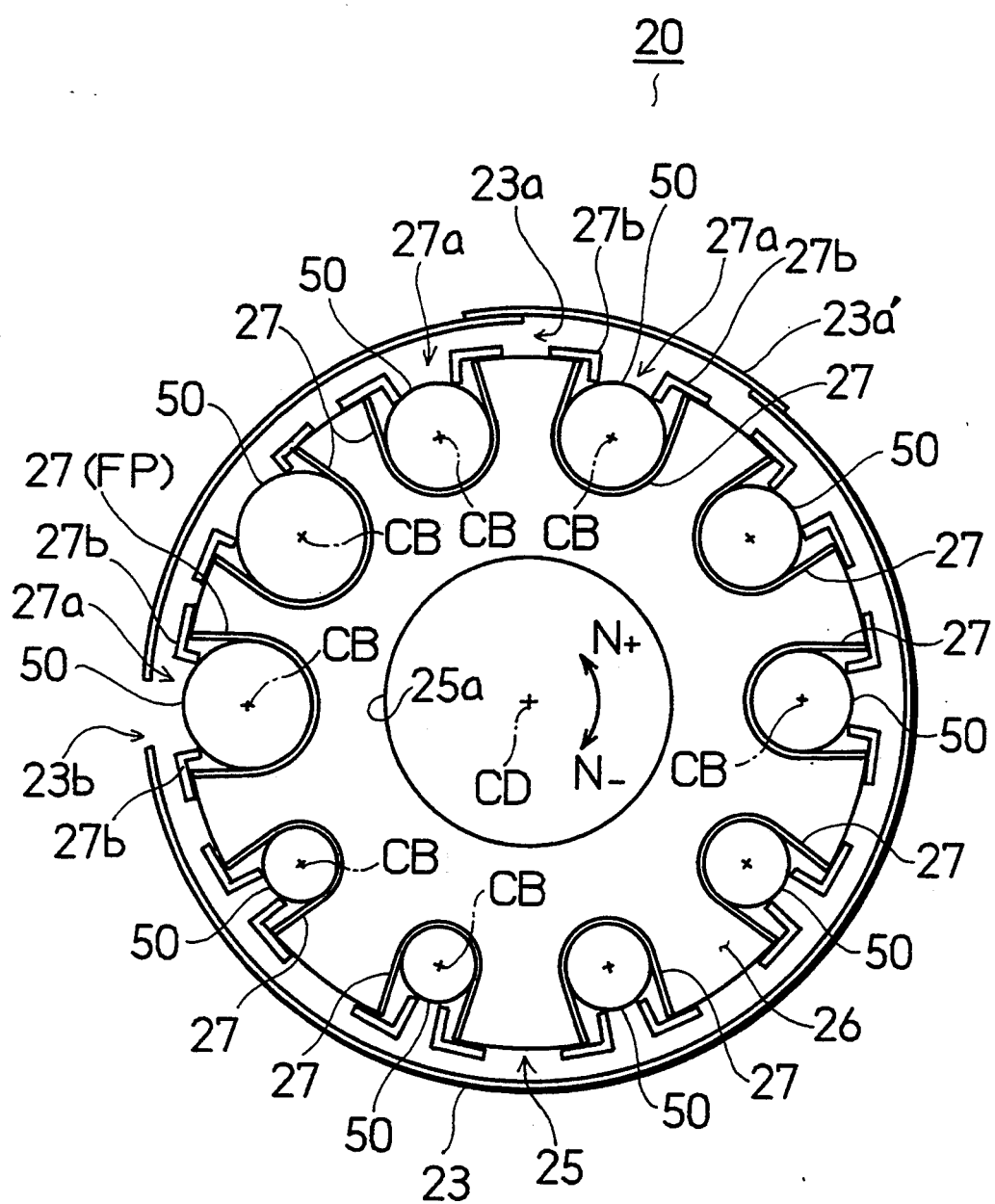
FIG. 11 is a side elevation of a storage drum of the bar supplier as shown in FIG. 10.

As shown in FIG. 9 or FIG. 11, the drum 25 is provided with a plurality of guide pockets 27 (the number thereof is ten in FIG. 11.) parallel to axis CD and circumferentially so as to be indexed at the feeding position FP by the rotation of the drum 25 in the directions of the arrows N+ and N− through a plurality of discs 26 (the number thereof is three in FIG. 9.), which are fixed on the rotating shaft 25a.

The guide pocket 27 is formed corresponding to the size of the bar stock 50, as shown in FIG. 11. For inserting and ejecting of the bar stock 50, openings 27a are provided. In the opening 27a, retaining members 27b, 27b for retaining the bar stock 50 in the guide pocket 27 are attachably and detachably installed through a bolt or the like. Between the retaining members 27b and 27b, a clearance in which a feeding arm 30, described hereinafter, can be inserted, is formed. The guide pocket 27 and the retaining member 27b extends from the left end to the right end of the drum 25 of FIG. 9 for supporting the bar stock 50 which became shorter. Both ends of the right and left of each guide pocket 27 in the figure open. In each guide pocket 27, a predetermined kind (such as diameter) of bar stock 50 is stored.

The bar supplier 20 is provided a drum cover 23 surrounding the rotating drum 25. As shown in FIG. 11, the drum cover 23 is provided with an entrance 23a of the bar stock 50. On the entrance 23a, a cover 23a' is attachably and detachably installed through a bolt or the like. On the drum cover 23, an opening 23b, having a width through which the feeding arm 30, described hereinafter, can be inserted, is formed parallel to axis CD, corresponding to the feeding position FP of the drum 25.

Figure 13:
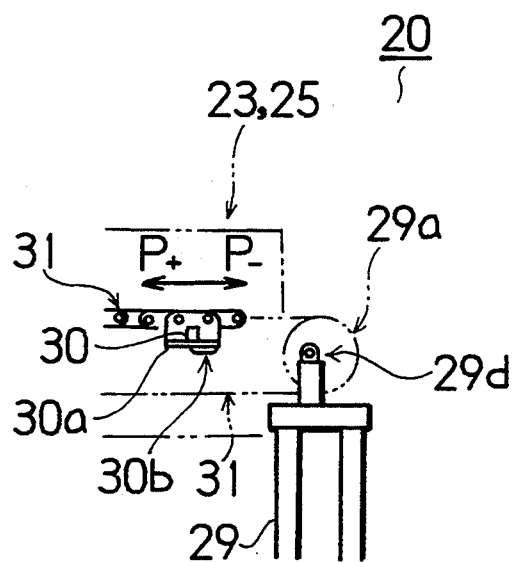
FIG. 13 is a front elevation showing origin detecting mechanism of a feeding arm of the bar supplier as shown in FIG. 9.

As shown in FIG. 9 or FIG. 13, the bar supplier 20 is provided with the feeding arm 30 being free to move in the directions of the arrows P+ and P− parallel to axis CD of the drum 25 so as to push the wide range of the bar stock 50 stored in the guide pocket 27 which is indexed at the feeding position FP (the position facing the opening 23b) as shown in FIG. 11, through supporting bases 29, 29', a motor 29b, sprockets 29a, 29a', a chain 31 having no end and a bracket 30a. The feeding arm 30 is fixed on the chain 31 through the bracket 30a and the chain 31 is installed between the sprockets 29a, 29a', supported by the supporting bases 29 and 29'. The sprocket 29a is connected with the motor 29b. The motor 29b is provided with an encoder 29c for detecting the movement distance of the feeding arm 30 (the chain 31). A limit switch 29d on the supporting base 29 and a dog 30b on the bracket 30a for detecting the original position of the feeding arm 30 are provided.

On the left hand of the drum 25 in FIG. 9 (main machine 2 side.), workpiece clamps 33, 33 are provided being free to open and close in the up and down directions in the figure through a cylinder 33a so as to clamp the bar stock 50 stored in the guide pocket 27 indexed at the feeding position FP, as shown in FIG. 10.

On the left upper hand of the drum 25 of FIG. 9 (main machine 2 side), as shown in FIG. 10, a slide 36 is provided being free to move in the directions of the arrows S+ and S− perpendicular to axis CD of the drum 25 through a supporting base 35, guides 35a and a motor 35b. The slide 36 is provided with a saw (circular saw) 40, such as a metal slitting saw or a tip saw, being free to rotate.

Figure 14A:
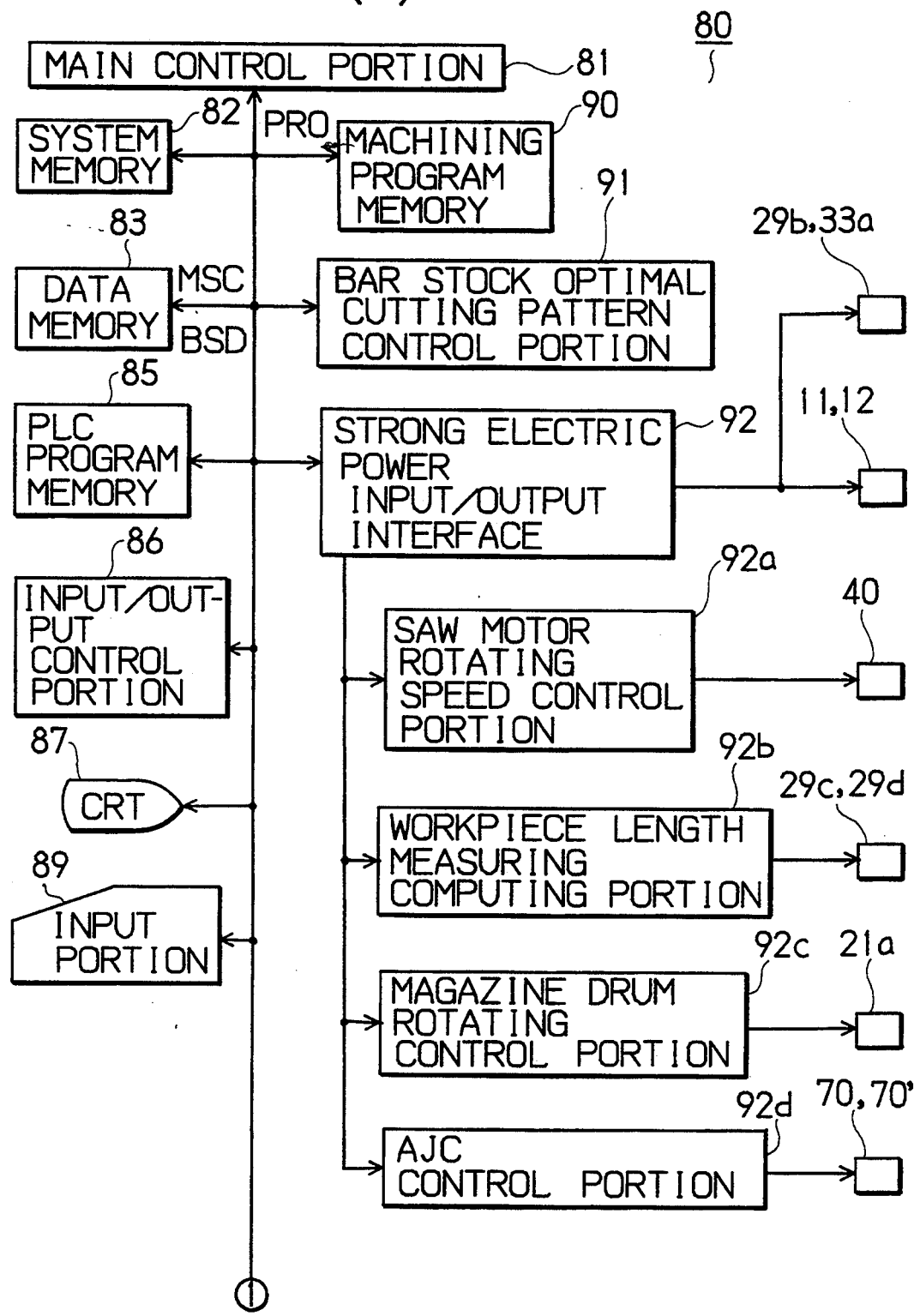
FIG. 14 is a control block diagram of the numerically controlled machine tool as shown in FIG. 1.
Figure 14B:
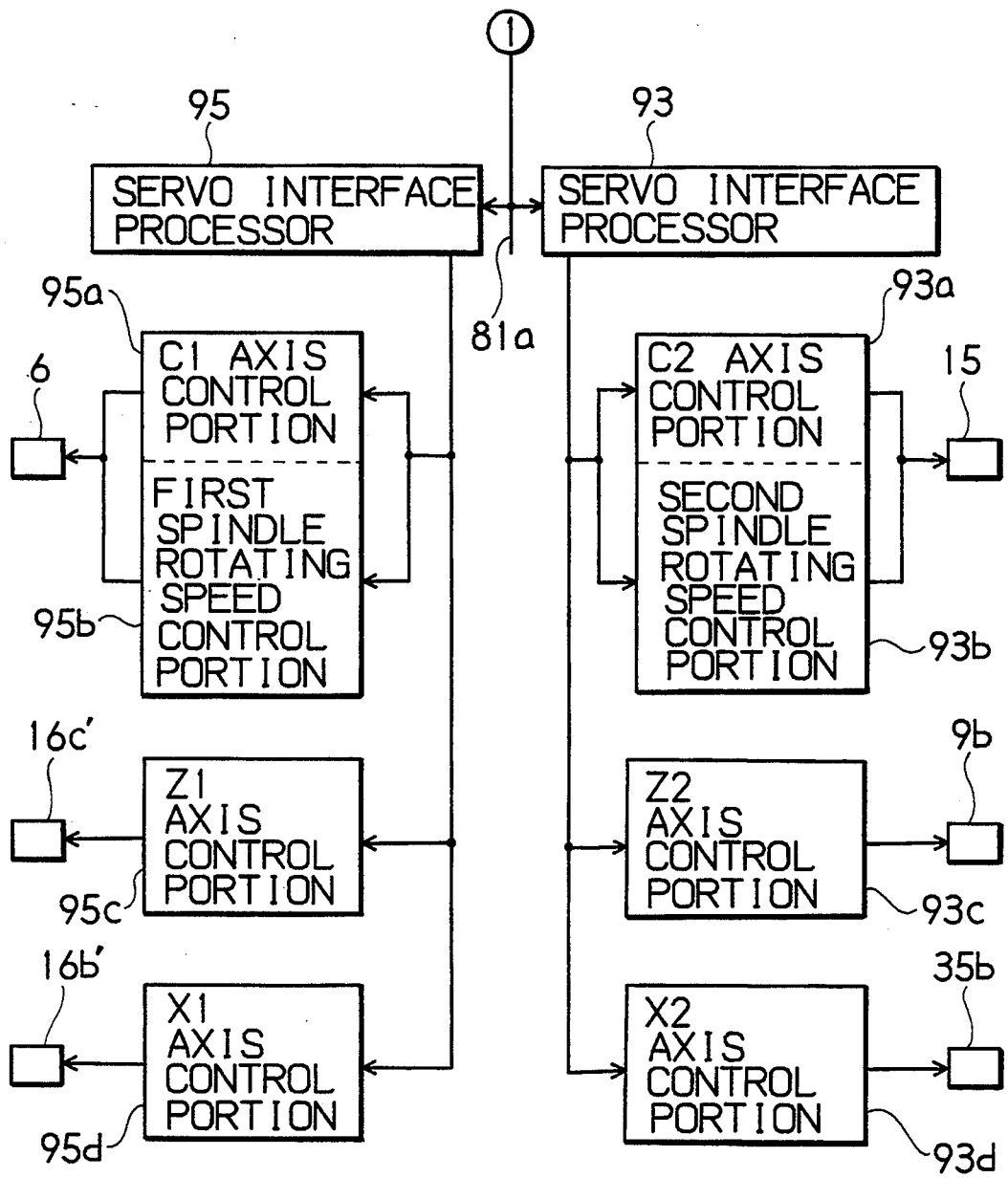

The opposed spindle lathe 1 has a control unit 80, as shown in FIG. 14. The control unit 80 has a main control portion 81. The main control portion 81 is connected with a system memory 82, a data memory 83, a PLC program memory 85, an input/output control portion 86, a CRT display 87, an input portion 89, such as a keyboard, a machining program memory 90, a bar stock optimal cutting pattern control portion 91, a strong electric power input/output interface ("IOIF" hereinafter) 92, servo interface processors ("SIFP" hereinafter) 93, 95 and the like through a bus line 81a.

The SIFP 93 is connected with a C2 axis control portion 93a, a second spindle rotating speed control portion 93b, a Z2 axis control portion 93c and a X2 axis control portion 93d. The C2 axis control portion 93a and the second spindle rotating speed control portion 93b are connected with a motor for rotating the second spindle 15. The Z2 axis control portion 93c is connected with the motor 9b for moving the second headstock 7 and the X2 axis control portion 93d is connected with the motor 35b for moving the slide 36 of the saw 40.

The SIFP 95 is connected with a C1 axis control portion 95a, a first spindle rotating speed control portion 95b, a Z1 axis control portion 95c and a X1 axis control portion 95d. The C1 axis control portion 95a and the first spindle rotating speed control portion 95b are connected with a motor for rotating the first spindle 6. The Z1 axis control portion 95c is connected with the motor 16c' for moving the carriage 16c of the tool rest 16 and the X1 axis control portion 95d is connected with the motor 16b' for moving the slide 16b of the tool rest 16.

The IOIF 92 is connected with the cylinders 11, 12 for rotating the second headstock 7, the motor 29b for moving the feeding arm 30 of the bar supplier 20 and the cylinder 33a for opening and closing the workpiece clamps 33. The IOIF 92 is connected with a motor for rotating the saw 40 through a saw motor rotating speed control portion 92a, and connected with the encoder 29c and the limit switch 29d for detecting the position of the feeding arm 30 through the workpiece length measuring computing portion 92b, and connected with the motor 21a for rotating the drum 25 through the magazine drum rotating control portion 92c, and connected with a cylinder and a motor for driving the AJC 70 and 70' through the AJC control portion 92d.

In the system memory 82, a NC software for executing automatic operation, described hereinafter, is stored. In the data memory 83, various kinds of parameters, such as servo parameters and various kinds of data, such as tool data and tool set data are stored. In the PLC program memory 85, strong electric power sequence is stored. In the machining program memory 90, a plurality of machining programs PRO are stored. The input/output control portion 86 communicates with external peripheral equipments.

In the data memory 83, as the bar stock storing data BSD, the data of diameter, material and the like of each bar stock 50, stored in each guide pocket 27 of the drum 25, inputted by an operator through the input portion 89 are stored corresponding to the identification number of the guide pocket 27 so as to read out on the basis of the identification number of the guide pocket 27.

In the data memory 83, as machining schedule MSC, the identification number of the guide pocket 27, the identification number of one or more than one machining program PRO to be used for machining on the bar stock 50, stored in the guide pocket 27 and the cycle of the machining program PRO (the number of the workpieces 50a to be machined), inputted by an operator through the input portion 89, are stored so as to read out according to machining order. The operator inputs the machining schedule MSC making reference to the bar stock storing data BSD, previously inputted.

With the above-described constitution of the opposed spindle lathe 1, the second headstock 7 of the main machine 2 is moved from the machining position as shown with two-dot long and two short dashes line in FIG. 1 to the sawing original position as shown with a full line in order to measure the entire length of the bar stock 50, described hereinafter, or in order to supply the bar stock 50 at the time of automatic operation.

Firstly, the main control portion 81 of the control unit 80, as shown in FIG. 14, drives the cylinder 12 as shown in FIG. 6 through the IOIF 92 so as to lift up the mounting shaft 10 and the second headstock 7 to the carriage 9 in the direction of the arrow I+. Then, the fixing members 7a, 9a depart from each other and the mounting shaft 10 and the second headstock 7 become rotatable with respect to the carriage 9. The main control portion 81 drives the cylinder 11 as shown in FIG. 5 through the IOIF 92 so as to move the piston rod 11a on the left hand in the figure. The mounting shaft 10 and the second headstock 7 are rotated 180 degrees with respect to the carriage 9 in the direction of the arrow B+ through the rack 11b and the pinion gear 10a. The mounting shaft 10 and the second headstock 7 are lowered in the direction of the arrow I— so as to fix the second headstock 7 with respect to the carriage 9 through the fixing members 7a, 9a. The rotating operation of the second headstock 7 in the directions of the arrows B+ and B— is precisely controlled since the position thereof is detected with the sensors 13b, 13c. Therefore, supply of the bar stock 50 from the bar supplier 20, described hereinafter, and delivery of the workpiece 50a from the second spindle 6 to the first spindle 15 can be properly executed.

Thereafter, the main control portion 81 as shown in FIG. 14 drives the motor 9b through the SIFP 93 and the Z2 axis control portion 93c so as to move the second headstock 7 together with the carriage 9 to the sawing original position, adjacent to the bar supplier 20, in the direction of the arrow A— in FIG. 1.

Prior to machining, the entire length of each bar stock 50, stored in the drum 25 of the bar supplier 20 is obtained.

The main control portion 81 as shown in FIG. 14 drives the motor 21a through the IOIF 92 and the magazine drum rotationg control portion 92c so as to properly rotate the drum 25 in the direction of the arrow N+ or N— of FIG. 11. A predetermined guide pocket 27 of the drum 25 is indexed at the feeding position FP.

The main control portion 81 drives the motor 29b through the IOIF 92 so as to move the feeding arm 30 in the direction of the arrow P+ of FIG. 9 through the chain 31. Then, the feeding arm 30 passes through the opening 23b as shown in FIG. 11 and is inserted inside the drum cover 23, and passes through the clearance between the retaining members 27b and 27b and inserted inside the guide pocket 27, indexed at the feeding position FP, and abuts on the back end of the long bar stock 50, stored in the guide pocket 27. The back end portion of the bar stock 50 is pushed by the feeding arm 30 so as to slide in the guide pocket 27 to the left hand of FIG. 9. The bar stock 50 projects the top end thereof from the opening portion of the left end of the guide pocket 27 of the figure and abuts on the chuck 15a of the second spindle 15, positioned at the sawing original position. Then, the bar stock 50 and the feeding arm 30 stop moving in the direction of the arrow P+.

The main control portion 81, as shown in FIG. 14, detects the original position of the feeding arm 30 through the workpiece length measuring cumputing portion 92b, the limit switch 29d and the dog 30b and detects the moving distance of the feeding arm 30 through the workpiece length measuring computing portion 92b and the encoder 29c. The main control portion 81 computes the entire length of the bar stock 50, stored in the guide pocket 27 indexed at the feeding position FP on the basis of the moving distance of the feeding arm 30 to the original position when the bar stock 50 abuts on the chuck 15a.

When the measurement of the entire length of the bar stock 50, stored in a predetermined guide pocket 27 finishes, the feeding arm 30 is moved in the direction of the arrow P− of FIG. 1 so as to move the second headstock 7 a predetermined distance in the direction of the arrow A−. Then, the bar stock 50 projecting from the guide pocket 27, indexed at the feeding position FP, is moved back inside the guide pocket 27 by being push by the chuck 15a of the second spindle 15. Then, the drum 25 becomes rotatable. When the bar stock 50 is moved back inside the guide pocket 27, the second headstock 7 is moved a predetermined distance in the direction of the arrow A+ so as to return to the sawing original position.

The drum 25 is properly rotated in the direction of the arrow N+ or N− of FIG. 11 in this way and respective guide pockets 27 of the drum 25 are indexed at the feeding position FP in order so as to measure the entire length of the bar stocks 50, stored in respective guide pockets 27 in order.

By the main control portion 81, as shown in FIG. 14, the values of the entire length of the bar stocks 50 are stored as the bar stock storing data BSD in the data memory 83 so as to be able to read out on the basis of the identification number of the guide pocket 27, storing the bar stock 50.

When the measurement of the entire length of the respective bar stocks 50, stored in the drum 25, finishes, the main machine 2 is supplied with a predetermined kind of the bar stock 50 from the bar supplier 20.

The drum 25 is properly rotated in the directions of the arrows N+ and N− of FIG. 11. Thereafter, the guide pocket 27 of a predetermined identification number, designated in the machining schedule MSC in the data memory 83, is indexed at the feeding position FP. Then, axis CB of a predetermind kind (diameter) of the bar stock 50, stored in the guide pocket 27 at the feeding position FP, corresponds with axis C2 of the second spindle 15. Thereafter, the feeding arm 30 is moved in the direction of the arrow P+ of FIG. 9. Then, the bar stock 50, stored in the guide pocket 27, indexed at the delivery position FP, is pushed by the feeding arm 30 in the back end thereof and projects the top end thereof from the opening portion of the left end of the guide pocket 27 in the figure.

The second headstock 7 is moved a predetermined distance in the direction of the arrow A− of FIG. 9 so as to clamp the top end portion of the bar stock 50 (the left end portion in the figure) projecting from the guide pocket 27, indexed at the feeding position FP of the drum 25 by the chuck 15a of the second spindle 15. The second headstock 7 is moved the distance equivalent to the length of one product (the workpiece 50a) in the direction of the arrow A+ in order that the second spindle 15 may depart from the bar supplier 20. Then, the bar stock 50, clamped with the chuck 15a of the second spindle 15, is pulled out of the guide pocket 27 of the drum 25 of the bar supplier 20 for the left hand in the figure. As the second headstock 7 is controlled with respect to the position (movement distance) thereof on the basis of Z2 axis which is the axis of coordinates, the second headstock 7, the second spindle 15 and the chuck 15a function as the positioning means of the bar stock 50 (means for deciding the length of the workpiece 50a) at the time of sawing the bar stock 50.

When the bar stock 50 is pulled out of the guide pocket 27, the main control portion 81 as shown in FIG. 14, drives the cylinder 33a through the IOIF 92 and the workpiece clamps 33, 33 are closed so as to clamp the bar stock 50. Then, the bar stock 50 is fixed with the chuck 15a of the second spindle 15 and the workpiece clamps 33. That is, the second headstock 7, the second spindle 15 and the chuck 15a function as the clamp means of the bar stock 50 as well as as the positioning means of the bar stock 50, as described before, at the time of sawing the bar stock 50.

The main control portion 81 rotates the saw 40 through the saw motor rotating speed control portion 92a. At the same time, the main control portion 81 drives the motor 35b through the SIFP 93 and the X2 axis control portion 93d so as to move the slide 36 in the direction of the arrow S+ of FIG. 9. Then, the bar stock 50 clamped with the chuck 15a of the second spindle 15 and the workpiece clamps 33, is sawed at a predetermined position with the saw 40 so as to hold the workpiece 50a of a predetermined length, cut off the long bar stock 50 with the second spindle 15 (the chuck 15a). In sawing of the bar stock 50 in the bar supplier 20, an appratus for rotatably supporting the long bar stock 50 at high speed is not necessary as the bar stock 50 is fixed. Therefore, as the bar stock 50, one excluding a cold finished bar, such as casting surface bar or bending bar, can be also used.

In case of sawing of the bar stock 50, the bar stock 50 may be rotated according to the kind (such as material and diameter) of the bar stock 50 through the second spindle 15. That is, the main control portion 81, as shown in FIG. 14, reads the bar stock storing data BSD (that is, the informations concerning the kind of the bar stock 50 stored in the guide pocket 27) corresponding to the identification number of the guide pocket 27, designated in the machining schedule MSC out of the data memory 83. Thereafter, the main control portion 81 decides the parameters of the machining program PRO, such as the power of workpiece clamping, rotating speed of a saw motor, the rotating angle of C2 axis, the feed of X2 axis and the like in such a manner that an optimal sawing pattern is decided on the basis of the bar stock storing data BSD read out, through the bar stock optimal cutting pattern control portion 91. The main control portion 81 controls the sawing operation of the bar stock 50 on the basis of the machining program PRO in which the parameters are decided, that is, on the basis of the optimal sawing pattern corresponding to the kind of the bar stock 50.

For instance, in case where the diameter of the bar stock 50 is rather big in comparison with the valid (effective) depth of cut of the saw 40, the pressure of clamping the workpiece clamps 33 as shown in FIG. 9 is made low and the bar stock 50 is made rotatable with respect to the workpiece clamps 33 and the guide pocket 27. The second spindle 15 and the bar stock 50 are rotated and the position of the bar stock 50 with respect to the saw 40 is properly changed so as to cut the bar stock 50 with the saw 40 two times or more. Furthermore, the bar stock 50 can be cut with the saw 40 rotating the bar stock 50 in such a manner that the pressure of clamping the workpiece clamps 33 is made low and the second spindle 15 is controlled with C-axis (or with low rotational speed). In case of the bar stock 50 having small diameter, the bar stock 50 may be cut rotating the second spindle 15 in order to shorten the cutting time thereof.

When the bar stock 50 is cut and the workpieces 50a are produced, the main control portion 81, as shown in FIG. 14, automatically updates the bar stock storing data BSD corresponding to the identification number of the guide pocket 27, storing the bar stock 50 cut (that is, the informations concerning the entire length of the bar stock 50 cut), stored in the data memory 83, on the basis of the length of the produced workpiece 50a, which is recognized as the movement distance of the second headstock 7 in the direction of the arrow A+. Therefore, management of the length of various kinds of bar stocks 50, stored in the bar supplier 20, as described hereinafter, can be automatically executed.

When the workpiece 50a of a predetermined length is cut off the long bar stock 50 and is held with the second spindle 15 (the chuck 15a) in this way, the second headstock 7 is moved to the machining position as shown with a full line in FIG. 2 in the direction of the arrow A+ so as to depart from the bar supplier 20. The second headstock 7 is rotated 180 degrees in the direction of the arrow B−. Then, as shown with a full line in FIG. 2, the second spindle 15 (the chuck 15a) faces the first spindle 6 (the chuck 6a) and axis C2 of the second spindle 15 and axis C1 of the first spindle 6 correspond with each other. At the same time, the workpiece 50a held with the second spindle 15 faces the tool rest 16, that is, in this state, machining can be executed.

Accordingly, it is not necessary that the second spindle 15 is hollow since the bar stock 50 is supplied for the front face of the second spindle 15 (on the chuck 15a side) in this embodiment, although the bar stock 50 is supplied by passing through a hollow spindle in a conventional method. Besides, the bar stock 50 having a big diameter can be also machined.

The main control portion 81, as shown in FIG. 14, rotates the second spindle 15 through the SIFP 93 and the second spindle rotating speed control portion 93b, and drives the motors 16c' and 16b' through the SIFP 95, the Z1 axis control portion 95c and X1 axis control portion 95d so as to properly move the tool rest 16 (the carriage 16c, the slide 16b) in the directions of the arrows E+ or E− and in the directions of the arrows F+ or F− in FIG. 2, on the basis of the machining program PRO of a predetermined identification number, designated in the machining schedule MSC, stored in the machining program memory 90. Then, the first process of machining is executed on the workpiece 50a (the portion cut off the long bar stock 50) held with the second spindle 15.

In case of machining, as described hereinbefore, the long bar stock 50 is shortly cut as the workpieces 50a, having a predetermined length. Therefore, vibration doesn't generate, being different from a conventional method, with which a long bar stock is rotated as it is. Accordingly, the second spindle 15 can be rotated at high speed. Furthermore, since it is not necessary that a draw tube or a filler tube is installed on the second spindle 15 in order to prevent vibration. Therefore a casting surface bar can be used as the bar stock 50, as well as a cold finished bar. Besides, the second process of machining, as described hereinafter, can be properly executed in a similar way.

When the first process of machining on the workpiece 50a on the second spindle 15 side finishes, the second headstock 7 is moved in the direction of the arrow A+ in FIG. 2 so as to approach the second headstock 7 and the first headstock 5 each other. The workpiece 50a on which the first process finishes is delivered to the chuck 6a of the first spindle 6 from the chuck 15a of the second spindle 15. That is, the second headstock 7, the second spindle 15 and the chuck 15a function as a carrying means of the workpiece 50a in case of delivery of the workpiece 50a.

On this occasion, clamping of premachined portion of the workpiece 50a with the chuck 15a is released after the machined portion of the workpiece 50a is clamped with the chuck 6a. The workpiece 50a is always clamped with the chuck 6a or the chuck 15a from the time of cutting off the bar stock 50 up to the machining finish of the second process of machining, described hereinafter, and is not free. That is, in both of the first and second process respective machining portions of the workpiece 50a can be corresponded with each other, thereby the first and second process are succeedingly executed. In result, machining efficiency and rate of operation can increase.

Thereafter, the main control portion 81, as shown in FIG. 14, rotates the first spindle 6 through the SIFP 95 and the first spindle rotating speed control portion 95b, and properly moves the tool rest 16 (the carriage 16c, the slide 16b) in the direction of the arrow E+ or E− and in the direction of the arrow F+ or F− of FIG. 2, on the basis of the machining program PRO of a predetermined identification number, so as to execute the second process of machining on the workpiece 50a delivered to the first spindle 6, following the first process of machining.

During the second process of machining on the workpiece 50a on the first spindle 6 side, the second headstock 7 is rotated 180 degrees in the direction of the arrow B+ of FIG. 1 so as to face the second spindle 15 (the chuck 15a) to the bar supplier 20. The second headstock 7 is moved in the direction of the arrow A− of FIG. 1 in order that the second spindle 15 (the chuck 15a) may approach the bar supplier 20.

In a similar way described hereinbefore, the top end of the bar stock 50, projecting from the guide pocket 27 of the feeding position FP of the drum 25, is clamped with the chuck 15a of the second spindle 15. After the bar stock 50 is pulled a predetermined length out of the guide pocket 27, the bar stock 50 is sawed with the saw 40 so as to cut a new workpiece 50a off the long bar stock 50.

On this occasion, the short bar stock 50 cut can be properly supplied since the supplying the second spindle 15 with the bar stock 50 from the bar supplier 20 is executed by moving the second headstock 7 and pulling the bar stock 50 out of the guide pocket 27.

On this occasion, the teeth of the saw 40 may be ones formed on the outside peripheral portion of a disc or on the inside peripheral portion of a circular ring, or may be ones in the shape of a belt. In case where the saw 40 having the teeth formed on the inside peripheral portion of the circular ring thereof is used, more teeth engage simultaneously with the bar stock 50 in comparison with use of the saw 40, which teeth are formed on the outside peripheral portion of a disc. Therefore, durability of the teeth thereof can increase and vibrations generated at the time of sawing of the bar stock 50 can be reduced, thereby the affection of sawing of the bar stock 50 on the second spindle 15 side on the second process of machining on the workpiece 50a on the first spindle 6 side can be prevented.

When the second process of machining on the workpiece 50a of the last time on the first spindle 6 side finishes, the first process of machining on a new workpiece 50a on the second spindle 15 side immediately starts since the second spindle 15 has been supplied with the new workpiece 50a. Therefore, the machining time of the bar stock 50 can be shortened.

On this occasion, the workpiece 50a on which the second process of machining finishes on the first spindle 6 side, is carried by a parts carrying means, such as a parts catcher.

In case where the sawing of the workpiece 50a out of a bar stock 50, stored in the guide pocket 27 of a predetermined identification number, indexed at the feeding position FP of the bar supplier 20 finishes for the cycles designated in the machining schedule MSC, the kind of the bar stock 50 for providing the main machine 2 from the bar supplier 20 is changed prior to the sawing of the workpiece 50a.

In case of change of the kind of the bar stock 50, the top end of the bar stock 50 projecting from the guide pocket 27 on the feeding position FP on the saw 40 side, is completely stored in the guide pocket 27 if all of the bar stock 50 of the last time was not used (if the part of the bar stock remains when the sawing of the workpieces 50a of the cycle designated in the machining schedule MSC finished). That is, the top end portion of the bar stock 50 sawed with the saw 40, projects from the guide pocket 27 at the feeding position FP. Then, when the sawing of the last workpiece 50a out of a predetermined bar stock 50 finishes, the workpiece clamps 33, 33 are opened and the feeding arm 30 is moved in the direction of the arrow P— of FIG. 1 so as to depart from the drum 25. And, the second headstock 7 is moved in the direction of the arrow A—, and the bar stock 50 is moved back into the guide pocket 27 by pushing with the last workpiece 50a held with the chuck 15a of the second spindle 15 immediately after the sawing of the last workpiece 50a out of a predetermined bar stock 50 finishes.

If necessary, the jaws 6b, 15b of the chucks 6a, 15a of the spindles 6, 15 of the main machine 2 are exchanged on the basis of the machining program PRO corresponding to the kind of the bar stock 50. Since the explanations of exchange of chuck jaws are described in U.S. Pat. No. 4,587,708, the exchange thereof will now be explained briefly. In case of exchange of the jaws 6b of the chuck 6a of the first spindle 6, the main control portion 81 controls the AJC 70 through the IOIF 92 and the AJC control portion 92d and a set of jaws 6b which is unsuitable, is taken out of each jaw groove 6a' of the chuck 6a in order so as to retrieve in the jaw magazine 71. Thereafter, a suitable set of jaws 6b is taken out of the jaw magazine 71 in order so as to install in each jaw groove 6a' of the chuck 6a. In case of exchange of the jaws 15b of the chuck 15a of the second spindle 15, the second headstock 7 is properly moved in the direction of the arrow A+ or A— in FIG. 2 and properly rotated in the direction of the arrow B+ or B— so as to face the chuck 15a to the AJC 70''. In a similar way to the case of the above-described AJC 70, the unsuitable jaws 15b are taken out of the chuck 15a so as to retrieve in the AJC 70' and the suitable jaws 15b are taken out of the AJC 70' so as to install in the chuck 15a.

Thereafter, the drum 25 of the bar supplier 20 is rotated in the direction of the arrow N+ or N— of FIG. 1 so as to index the guide pocket 27 of the next identification number, designated in the machining schedule MSC, at the feeding position FP. In a similar way as described hereinbefore, the feeding arm 30 is moved in the direction of the arrow P+ of FIG. 1 so as to feed a predetermined kind of the bar stock 50, stored in the guide pocket 27 to the main machine 2 side. Therefore, a predetermined kind of the bar stock 50 can be automatically selected among the various kinds of the bar stocks 50, stored in the drum 25 and can be supplied to the main machine 2 side in the bar supplier 20, thereby the bar supplier 20 can be properly applied to a small amount production for many kinds without changes in setup.

In the opposed spindle lathe 1, management of the various kinds of the bar stocks 50, stored in the bar supplier 20 is automatically performed on the basis of the bar stock storing data BSD, which are updated whenever the bar stock 50 is sawed, stored in the data memory 83 as shown in FIG. 14. In case where the datum of the entire length in the bar stock storing data BSD with respect to the remaining bar stock 50 stored in a predetermined guide pocket 27 is over a predetermined value, the bar stock 50 is stored in the guide pocket 27 as it is and will be used if necessary in the execution of the machining schedule for the next time or later. On this occasion, since the feeding arm 30 can be moved for wide range in the directions of the arrows P+ and P— through the chain 31 in the bar supplier 20, even the short bar stock 50 can be properly supplied to the main machine 2 side. In case where the datum of the entire length in the bar stock storing data BSD with respect to the remaining bar stock 50, stored in a predetermined guide pocket 27 is below a predetermined value, the bar stock 50a is clamped with the chuck 15a of the second spindle 15, the second headstock 7 is moved in the direction of the arrow A+ of FIG. 1 and the bar stock 50 is pulled out of the guide pocket 27 so as to expel.

In FIG. 11, round bars are shown as the bar stocks 50. However, bars or pipes having various forms, such as triangle, quadrangle, hexagon and special shape (having sectional shape being not longitudinally uniform), can be automatically supplied as the bar stock 50 with the bar supplier 20. These bar stocks 50 having various kinds of shapes can be automatically machined with the main machine 2. Besides, the chuck jaws 6b, 15b of the spindles 6, 15 can be automatically exchaged according to the form of the bar stock 50 with the AJC 70, AJC 70'.

It was mentioned that the second headstock 7, the second spindle 15 and the chuck 15a function as a positioning means and a clamping (holding) means of the bar stock 50 at the time of sawing and as a carrying means of the workpiece 50a at the time of delivery as well as as a clamping (gripping) means of the workpiece 50a at the time of machining, which is the main function. The positioning means, clamping (holding) means or the carrying means may be separately provided. And, the clamping ( holding ) means and the carrying means may be provided on the bar supplier 20 side as separate apparatuses or an united apparatus.

It was mentioned that two headstocks 5, 7 and the spindles 6, 15 are provided. However, one headstock and one spindle may be provided. That is, one or more than one components, which function as the positioning means, the clamping (holding) means and the carrying means, described above, may be provided in place of the second headstock 7 and the second spindle 15. Through this component, the bar stock 50 is sawed and the workpiece 50a produced may be supplied to the first spindle 6.

It was mentioned that in case where the workpiece 50a held with the second spindle 15 is faced to the tool rest 16, the second headstock 7 is rotated in the direction of the arrow B— so as to face the workpiece 50a (the chuck 15a) to the left hand in FIG. 2 (the first headstock 5 side) in the first process of machining on the workpiece 50a on the second spindle 15 side. However, the workpiece 50a, held with the second spindle 15, may be faced to the tool rest 16 in such a manner that the second headstock 7 is moved in the direction of the arrow A+ to maximum extent facing the chuck 15a (the workpiece 50a) of the second spindle 15 to the right hand in FIG. 2 (the bar supplier 20 side) without rotating the second headstock 7.

It was mentioned that in case of the first process of machining on the workpiece 50a on the second spindle 15 side, the second headstock 7 is stopped and the tool rest 16 is moved in the direction of the arrow E+ or E— and in the direction of the arrow F+ or F— in FIG. 2. However, the tool rest 16 may be moved in the direction of the arrow F+ or F— by moving the second headstock 7 in the direction of the arrow A+ or A—.

Besides, it was mentioned that in case of machining the workpiece 50a is held with either the first spindle 6 or the second spindle 15. However, in case where the workpiece 50a is a long shaft workpiece, the workpiece 50a may be held with both of the first spindle 6 and the second spindle 15. For instance, hollow spindles are used as the spindles 6, 15. In case of sawing of the workpiece 50a out of the bar stock 50 with the saw 40, a portion of the workpiece 50a is inserted into the second spindle 15. In case of machining, the workpiece 50a is held with both of the first spindle 6 and the second spindle 15, and the premachined portion of the workpiece 50a is pulled out of the second spindle 15 by relative movement of the first headstock 5 and the second headstock 7 so as to machine. Then, the machined portion of the workpiece 50a is inserted into the first spindle 6. In this method, it is necessary to use hollow spindles. However, since the workpiece 50a (shaft workpiece) is shorter than the bar stock 50, vibrations can be prevented at the time of rotating and machining can be properly executed.

It was mentioned that the workpieces 50a each having a length equivalent to a product are sawed out of the bar stock 50 one by one. However, a bar workpiece having a length equivalent to the plural numbers of products may be sawed out of the bar stock 50. That is, hollow spindles are used as the spindles 6, 15. At the time of sawing of the bar workpiece out of the bar stock 50, a portion of the bar workpiece is inserted into the second spindle 15. The bar workpiece is pulled out of the second spindle 15 through the first spindle 6 by relative movement of the first headstock 5 and the second headstock 7 so as to machine the portion of the bar workpiece, projecting from the second spindle 15. Thereafter, the machined portion of the bar workpiece is cut off by turning. In case of this method, it is necessary to use hollow spindles. However, since the bar workpiece is shorter than the bar stock 50, vibrations can be prevented at the time of rotating and machining can be properly performed.

It was mentioned that the second spindle 15 is selectively faced to the first spindle 6 or the guide pocket 27 in such a manner that the second headstock 7 is rotated on axis CR perpendicular to axis C1 of the first spindle 6. However, in order to selectively face the second spindle to the first spindle or the guide pocket, the second headstock may be parallel moved or may be rotated on the axis parallel to the first spindle so as to move in such a state that the first spindle and guide pocket are parallel disposed.

Besides, it was mentioned that the main machine 2 has two headstocks 5, 7 and one tool rest 16. However, the main machine may have two headstocks and two tool rests, the same as a main machine 202 of an opposed spindle lathe 201, described hereinafter.

Figure 15:
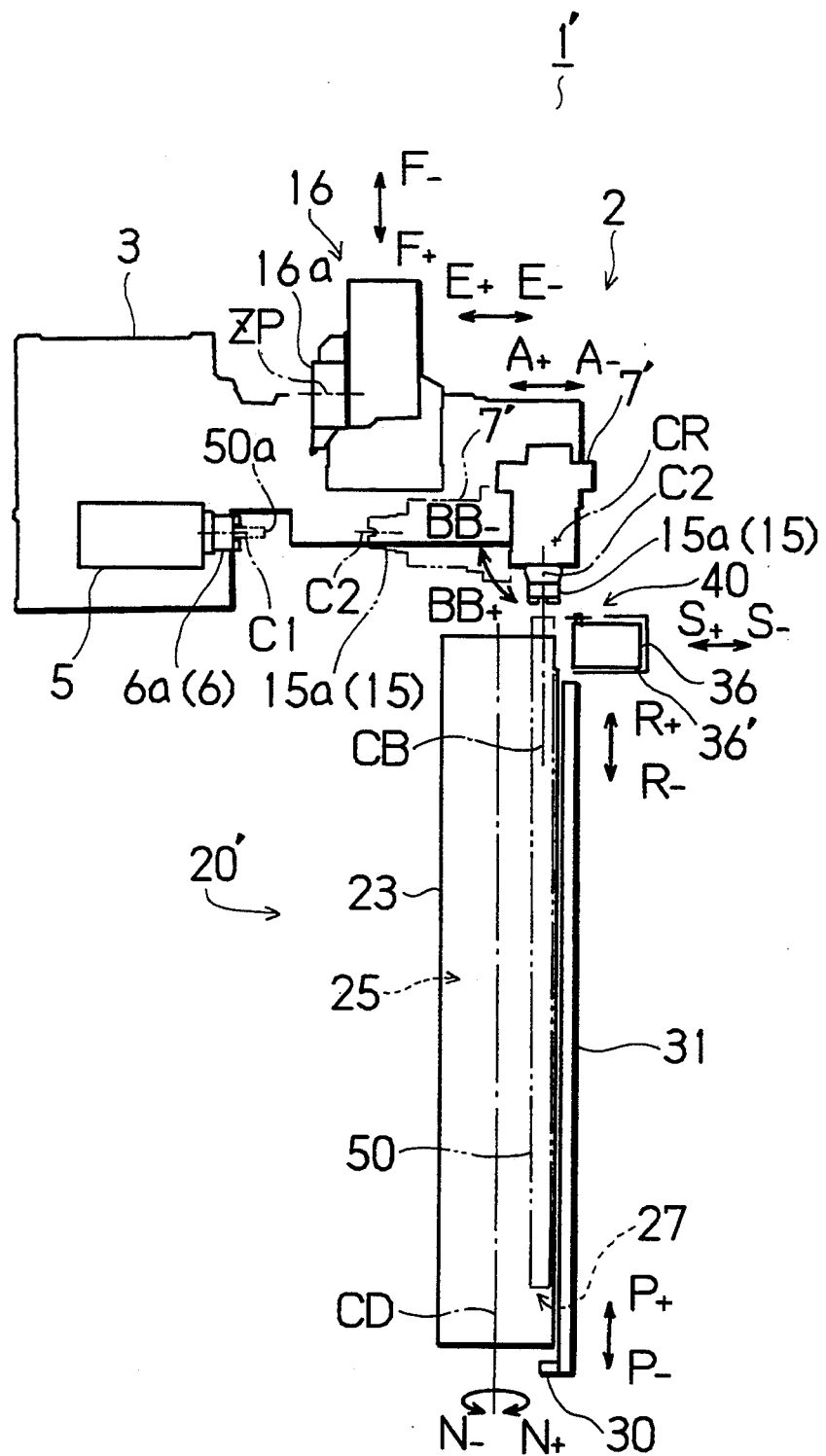
FIG. 15 is a top view showing another embodiment of the numerically controlled machine tool according to the present invention.

On this occasion, in the opposed spindle lathe 1 as shown in FIG. 1, the bar supplier 20 is disposed on the side of the main machine 2 and the second headstock 7 is rotated 180 degrees. However, the arrangement of the bar supplier with respect to the main machine and rotational angle of the second headstock may be properly changed as long as the second spindle 15 can be selectively faced to the first spindle 6 (and the tool on the tool rest 16) or the guide pocket 27. For instance, as the opposed spindle lathe 1' as shown in FIG. 15, a bar supplier 20' may be disposed on the front of the main machine 2 and the second headstock 7 may be rotated 90 degrees in the direction of the arrow BB+ or BB—. In the opposed spindle lathe 1", the saw 40 is made movable in the directions of the arrows R+ and R— parallel to center axis CD of the drum 25 through a carriage 36'. In the opposed spindle lathe 1', supplying the second spindle 15 with the bar stock 50 from the guide pocket 27 is executed by moving the feeding arm 30 in the direction of the arrow P+ without moving the second headstock 7.

On this occasion, for the components of the opposed spindle lathe 1' as shown in FIG. 15 the same as ones of the opposed spindle lathe 1 as shown in FIG. 1, such as the main machine 2, the same numbers are used. The explanations thereof will be omitted.

It was mentioned in the embodiment described hereinbefore that various kinds of bar stocks 50 are automatically selected so as to supply the main machine 2, whereby the machine of the present invention is applied to small volume production for various kinds. However, the machine of the present invention can be applied to volume production for a small number of kinds by efficiently supplying the main machine 2 with the same kind of bar stocks 50.

Figure 16:
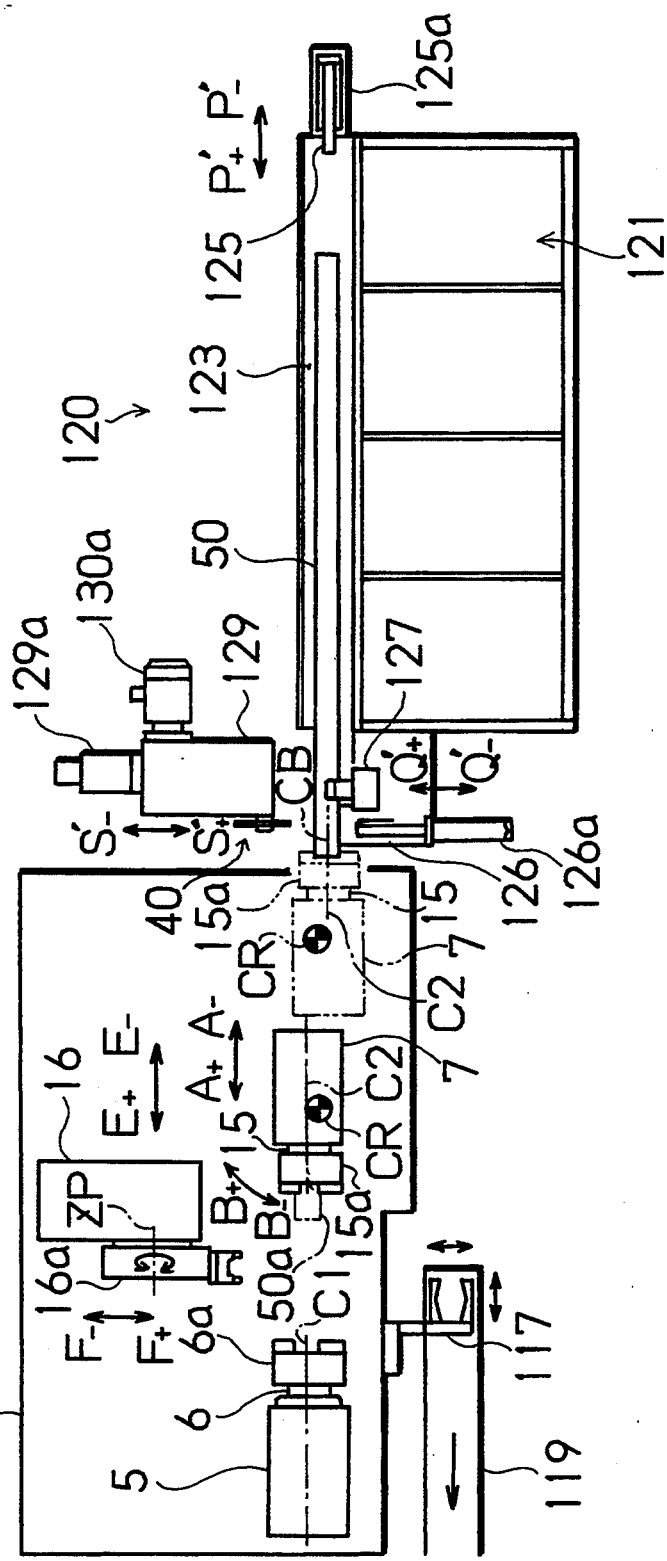
FIG. 16 is a top view showing another embodiment of the numerically controlled machine tool according to the present invention.

As shown in FIG. 16, an opposed spindle lathe 101 has the main machine 2. Near the first headstock 5 of the main machine 2, a carrying conveyer 119 for carrying a machined workpiece 50a is provided. Near the first headstock 5 and the carrying conveyer 119, an unloader 117 for transferring the machined workpiece 50a from the first spindle 6 to the carrying conveyer 119 is provided.

Figure 17:
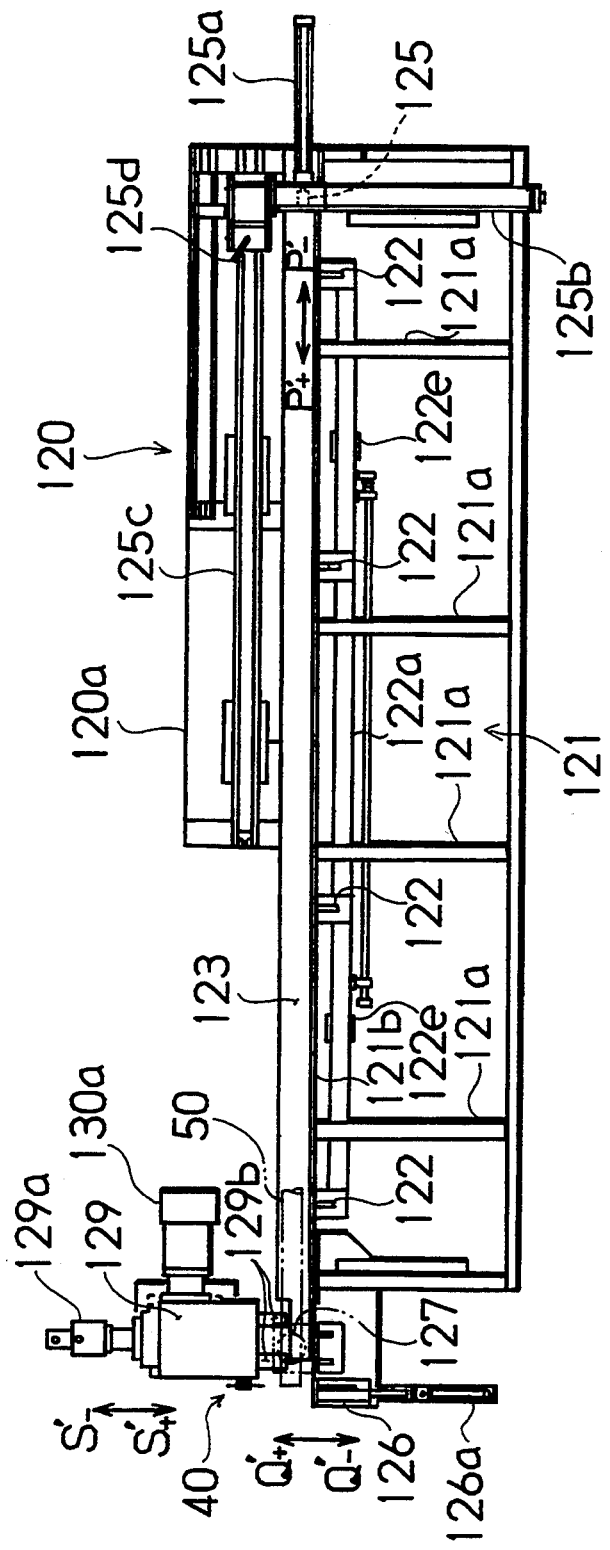
FIG. 17 is a top view showing the details of the bar supplier of the numerically controlled machine tool as shown in FIG. 16.

On the right hand of the main machine 2 of the opposed spindle lathe 101 in FIG. 16, a bar supplier 120 is provided. As shown in FIG. 17, the bar supplier 120 has a base 120a. The base 120a is fixedly provided with a material shelf 121.

The material shelf 121 is provided with a plurality of frames 121a at predetermined intervals in the right and left directions in the figure. On the frames 121a, a plurality of bar stocks 50 are stacked so as to place closely. The frames 121a incline to the left lower portion in FIG. 19. At the left end of the frames 121a in the figure, a partition plate 121b is provided so as to stop rolling down of the bar stock 50 on the frames 121a. On the lower hand of the frames 121a of FIG. 18 or FIG. 19, kickers 122 are provided so as to be free to lift up and down with cylinders 122e in the directions of the arrows N'+ and N'−, projecting to the position higher than the partition plate 121b passing through the clearances of the frames 121a, 121a.

Figure 19:
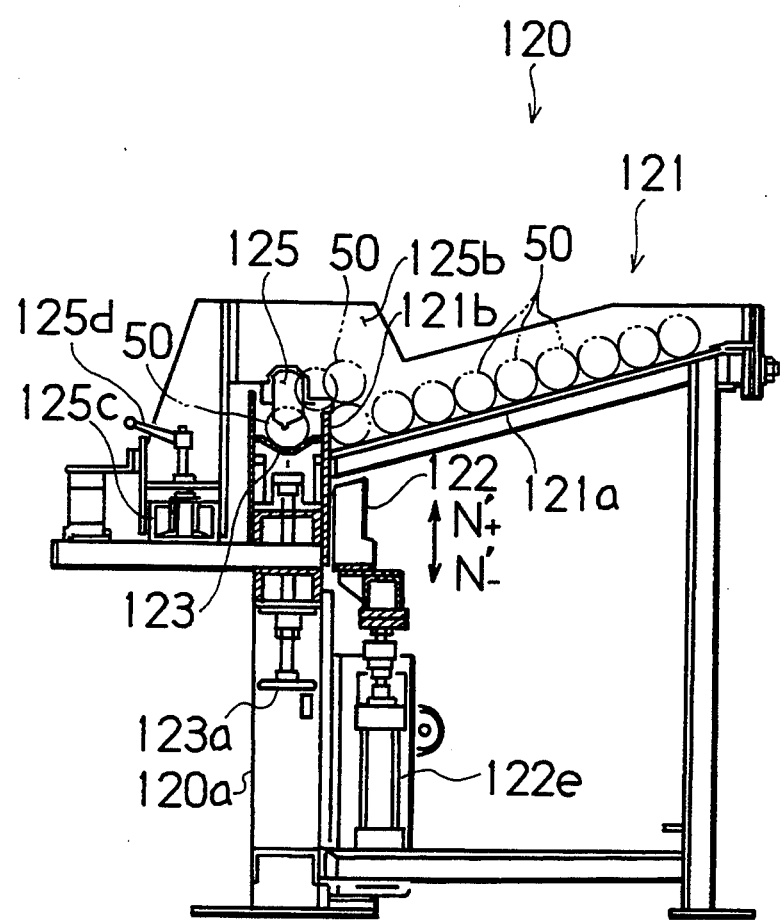
FIG. 19 is a sectional view projected from the side face direction of the bar supplier as shown in FIG. 17.

As shown in FIG. 19, the bar supplier 120 has a guide rail 123 in the shape of V, which is disposed parallel to the movement directions of the second headstock 7 (in the direcctions of the arrows A+ and A−) so as to correspond axis CB of the bar stock 50 put on the guide rail 123 with axis C2 of the second spindle 15. Besides, the guide rail 123 is partitioned by the partition plate 121b, separating from the material shelf 121, as shown in FIG. 19. Under the guide rail 123, a handle 123a for adjusting the height of the guide rail 123 in order to correspond axis CB of the bar stocks 50, having different outer diameters, respectively, with axis C2 of the second spindle 15 is provided. The height of the guide rail 123 may be automatically adjusted through a driving means, such as a cylinder. The left end portion of the guide rail 123 of FIG. 17 (the main machine 2 side) opens so as to pass the bar stocks 50 through.

On the right hand of the guide rail 123 in the figure, a feeding rod 125 is provided being free to project and recede in the directions of the arrows P'+ and P'− parallel to the guide rail 123 through a cylinder 125a. On this occasion, the feeding rod 125 and the cylinder 125a are provided on a bracket 125b and the movement of the bracket 125b in the right and left directions in the figure through a guide 125c and a clamper 125d can be adjusted according to the length of the bar stock 50.

Figure 18:
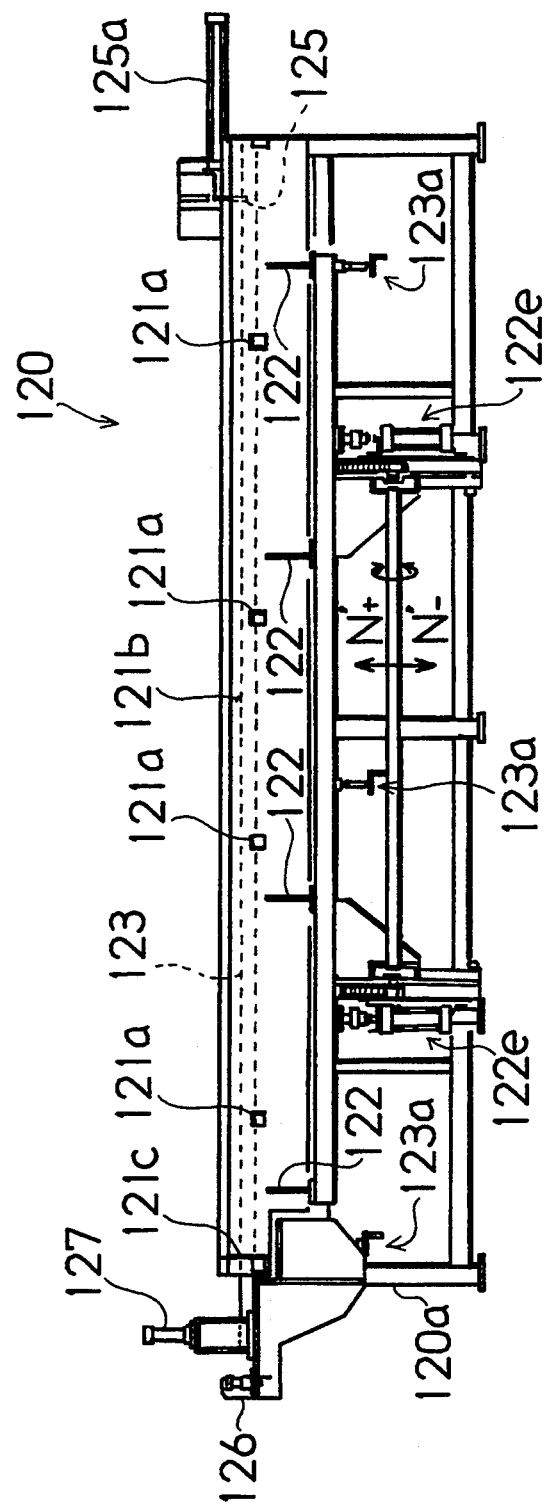
FIG. 18 is a front elevation of the bar supplier as shown in FIG. 17.

At the left end portion of the guide rail 123 of FIG. 18, a clamp cylinder 127 for clamping the bar stock 50 put on the guide rail 123 is provided. On the left hand of the clamp cylinder 127 of FIG. 17, a stopper 126 is provided being free to project and recede in the directions of the arrows Q'+ and Q'− through a cylinder 126a properly interrupting the open portion of the left end of the guide rail 123 in the figure.

On the left hand of the open portion of the left end of the figure of the guide rail 123 of the bar supplier 120, a slide 129 is provided being free to move in the directions of the arrows S'+ and S'− perpendicular to the guide rail 123 through a motor 129a and guides 129b. On the slide 129, the saw 40 is provided being free to rotate with a motor 130a.

As for the components of the opposed spindle lathe 101 as shown in FIG. 16, the same as the components of the opposed spindle lathe 1 as shown in FIG. 1, such as the main machine 2, described hereinbefore, the same numerals as the components of the opposed spindle lathe 1 are used, the explanation thereof will be omitted. The main machine 2 of the opposed spindle lathe 101 doesn't have the AJC.

With the above-described arrangement of the opposed spindle lathe 101, in case of automatic operation, one of the long shaped bar stocks 50 is taken out of the material shelf 121 of the bar supplier 120 so as to put on the guide rail 123. That is, the kickers 122 are lifted up in the direction of the arrow N'+ of FIG. 19 through the cylinders 122e. Then, one of the bar stocks 50 on the frames 121a, being on the upper hand of the kickers 122 of the figure, is pushed in the upper direction in the figure getting over the partition plate 121b so as to drop on the guide rail 123.

The stopper 126 is projected in the direction of the arrow Q'+ of FIG. 17 through the cylinder 126a so as to interrupt the open portion of the left end of the guide rail 123 in the figure (the main machine 2 side). Thereafter, the feeding rod 125 is projected in the direction of the arrow P'+ through the cylinder 125a. Then, one long shaped bar stock 50 on the guide rail 123 is pushed in the back end portion thereof by the feeding rod 125 so as to move on the guide rail 123 to the main machine 2 side. The movement of the bar stock 50 stops when the top end portion of the bar stock 50 abuts on the stopper 126.

When the bar stock 50 abuts on the stopper 126, the bar stock 50 is fixed on the guide rail 123 through the clamp cylinder 127, thereafter the feeding rod 125 is receded in the direction of the arrow P'− through the cylinder 125a, and the stopper 126 is receded in the direction of the arrow Q'− through the cylinder 126a.

Thereafter, the second headstock 7 of the main machine 2 is rotated 180 degrees in the direction of the arrow B+, as shown with a two-dot long and two short dashes line in FIG. 16, so as to correspond axis C2 of the second spindle 15 with axis CB of the bar stock 50 on the guide rail 123. The second headstock 7 is moved in the direction of the arrow A− so as to clamp the top end portion (the left end portion in the figure) of the bar stock 50 projecting from the guide rail 123 by the chuck 15a of the second spindle 15.

Thereafter, the clamp cylinder 127 is unclamped. Thereafter, the second headstock 7 is moved a predetermined distance in the direction of the arrow A+ so as to pull the bar stock 50 clamped by the chuck 15a of the second spindle 15 out of the guide rail 123. Then, the bar stock 50 is clamped by the clamp cylinder 127, again.

The saw 40 is rotated with the motor 130a and the slide 129 is moved in the direction of the arrow S' with the motor 129a. Then, the bar stock 50, fixed by the chuck 15a of the second spindle 15 and the clamp cylinder 127 is sawed at a predetermined position thereof and with the second spindle 15 (the chuck 15a) the workpiece 50a of a predetermined length, cut off the long bar stock 50 is held.

In sawing of the bar stock 50 in the bar supplier 120, an apparatus for rotatably supporting the long bar stock 50 at high speed, is unnecessary as the bar stock 50 is fixed. Therefore, use of the same guide rail 123 can be flexibly applied to various alterations of the diameter and the form of the bar stock 50. As the bar stock 50, a bar rather than a cold finished bar, such as a casting surface bar and a bending bar, can also be used.

When the workpiece 50a is cut off the bar stock 50 in this way, a first process of machining is performed on the workpiece 50a with the second headstock 7 and the tool rest 16 in a similar manner to the case of the opposed spindle lathe 1, described hereinbefore. The workpiece 50a is delivered to the first spindle 6 from the second spindle 15 so as to perform a second process of machining on the workpiece 50a with the first headstock 5 and the tool rest 16.

Since the effects almost the same as one of the opposed spindle lathe 1, described hereinbefore, are obtained in the opposed spindle lathe 101, the long bar stocks 50 can be properly machined. With respect to the opposed spindle lathe 101 apparatus, dispositions or methods may be properly changed, in a similar manner to the various alterations with respect to the opposed spindle lathe 1 (such as the opposed spindle lathe 1'), described hereinbefore.

It was mentioned in the above-mentioned embodiment that the saw 40 is provided separating from the tool rest 16. However, the saw 40 may be provided on the tool rest.

Figure 20:
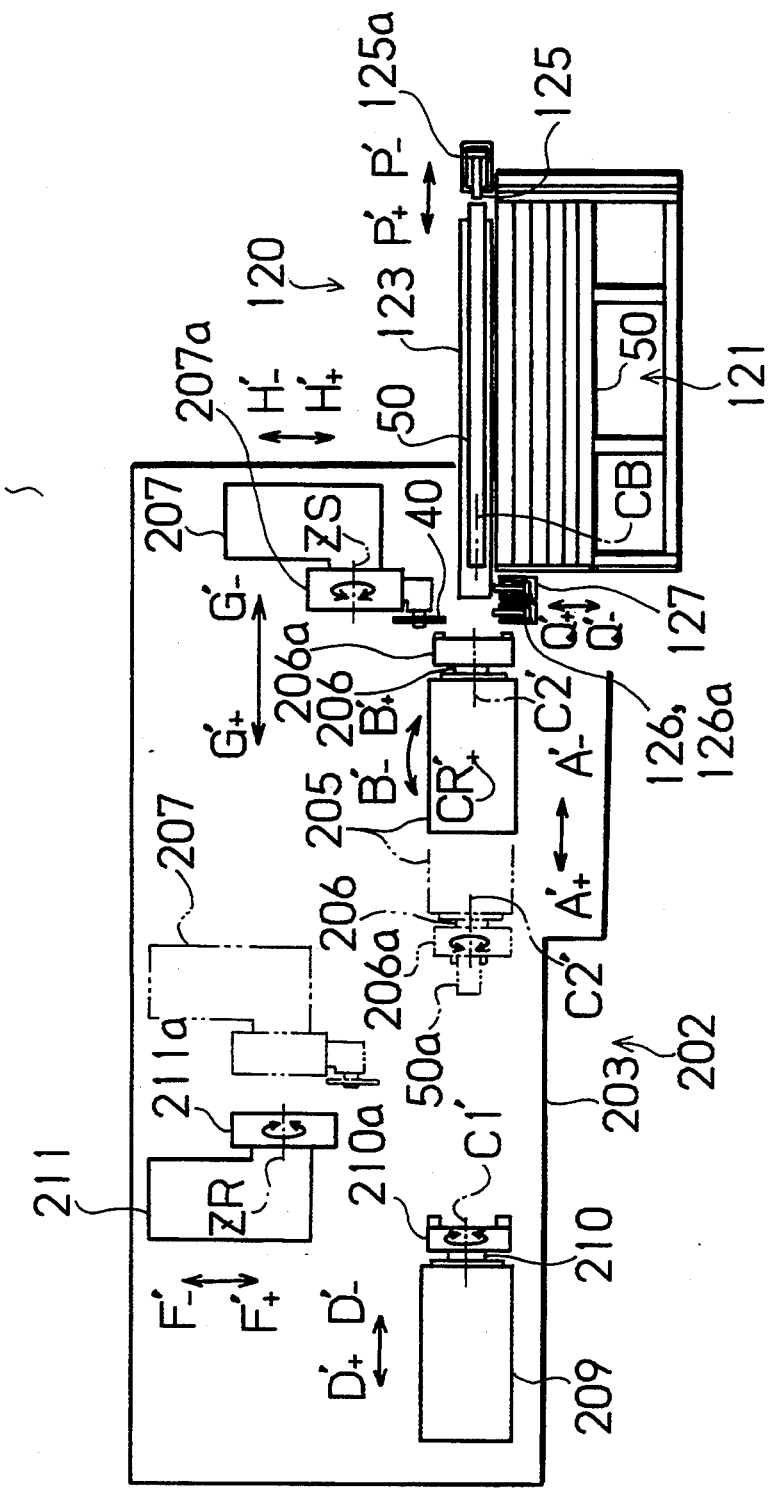
FIG. 20 is a top view showing another embodiment of the numerically controlled machine tool according to the present invention.

The opposed spindle lathe 201 has the main machine 202, as shown in FIG. 20. The main machine 202 has a base 203. At the left portion of the base 203 in the figure, a first headstock 209 is provided being free to move in the directions of the arrows D'+ and D'−. The first headstock 209 is provided with a first spindle 210 being free to rotate on axis C1' disposed parallel to the movement directions of the first headstock 209 (in the directions of the arrows D'+ and D'−). On the front face of the first spindle 210 (the right face in the figure) a chuck 210a is installed.

On the base 203, a first tool rest 211 is provided being free to move in the directions of the arrows F'+ and F'−, perpendicular to the movement direction of the first headstock 209. On the first tool rest 211, a turret 211a is provided being free to rotate on axis ZR parallel to axis C1' of the first spindle 210. On the turret 211a, a plurality of tool installation positions are circumferentially provided on axis ZR so as to index by rotation of the turret 211a. On each tool installation position, a tool, such as a cutting tool and an end mill, is intalled.

At the right portion of the base 203 in the figure, a second headstock 205 is provided being free to move in the directions of the arrows A'+ and A'−, parallel to the movement direction of the first headstock 209 (in the directions of the arrows D'+ and D'−), and being free to rotate 180 degrees in the directions of the arrows B'+ and B'− on axis CR', through a similar mechanism to the second headstock 7 of the main machine 2 of the opposed spindle lathe 1, described hereinbefore. The second headstock 205 is provided with a second spindle 206 being free to rotate on axis C2' disposed so as to selectively correspond with axis C1' of the first spindle 210 or axis CB of the bar stock 50 put on the guide rail 123 of the bar supplier 120, described hereinafter, by the rotation of the second headstock 205 in the directions of the arrows B'+ and B'−. On the front face of the second spindle 206, a chuck 206a is installed.

On the base 203, a second tool rest 207 is provided being free to move in the directions of the arrows G'+ and G'− parallel to the movement directions of the second headstock 205 (in the directions of the arrows A'+ and A'−) and, in the directions of the arrows H'+ and H'− perpendicular to the movement directions of the second headstock 205. On the first tool rest 207, a turret 207a is provided being free to rotate on axis ZS parallel to axis C1' of the first spindle 210. On the turret 207a a plurality of tool installation positions are circumferentially provided on axis ZS so as to index by the rotation of the turret 207a. On tool installation positions the saw 40 is installed being free to rotate, in addition to tools, such as a turning tool or an end mill. As the rolling mechanism of the saw 40, the rolling mechanism of a milling cutter, such as an end mill can be used.

On the right hand of the main machine 202 in FIG. 20, the bar supplier 120 is provided.

Since for the components of the opposed spindle lathe 201 as shown in FIG. 20, the same as ones of the opposed spindle lathe 101 as shown in FIG. 16, such as the bar supplier 120, the same numerals as ones of the opposed spindle lathe 101 are used, the explanation thereof will be omitted.

With the above-described arrangement of the opposed spindle lathe 201, in case of automatic operation, one of the long bar stocks 50 is taken out of the material shelf 121 of the bar supplier 120 so as to put on the guide rail 123. The bar stock 50 put on the guide rail 123 is moved to the left hand in the figure through the feeding rod 125 properly using the stopper 126, and clamped through the clamp cylinder 127.

The second headstock 205 is rotated 180 degrees in the direction of the arrow B'+, as shown with the full line in the figure so as to correspond axis C2' of the second spindle 206 with axis CB of the bar stock 50 on the guide rail 123. The second headstock 205 is moved in the direction of the arrow A'− so as to approach the bar supplier 120. The bar stock 50 on the guide rail 123 is clamped with the chuck 206a of the second spindle 206.

Thereafter, the clamp cylinder 127 is released. The second headstock 205 is moved a predetermined distance in the direction of the arrow A'+ so as to isolate from the bar supplier 120. The bar stock 50 clamped with the chuck 206a of the second spindle 206 is pulled a predetermined length out of the guide rail 123 of the bar supplier 120. Then, the bar stock 50 is clamped through the clamp cylinder 127, again.

The second tool rest 207 is moved to the sawing area between the second headstock 205 and the bar supplier 120 from the machining area between the first headstock 209 and the second headstock 205, in the direction of the arrow G'−, as shown with the full line in the figure. The saw 40 is rotated and the second tool rest 207 is moved in the direction of the arrow H'+ so as to saw the bar stock 50 clamped with the second spindle 205 and the clamp cylinder 127.

When the workpiece 50a cut off the bar stock 50 is held with the second spindle 206 in this way, the second headstock 205 is moved in the direction of the arrow A'+ and rotated 180 degrees in the direction of the arrow B'− so as to correspond axis C2' of the second spindle 205 with axis C1' of the first spindle 210 as shown with the two-dot long and two short dashes line in the figure. And, the second tool rest 207 is moved to the machining area from the sawing area in the direction of the arrow H'− and in the direction of the arrow G'+ so as to face the workpiece 50a held with the second spindle 206, as shown with the full line in the figure. The second spindle 206 is rorated and the second headstock 205 is moved in the directions of the arrows A'+ and A'−, and the second tool rest 207 is properly moved in the directions of the arrows H'+ and H'− so as to perform the first process of machining on the workpiece 50a held with the second spindle 206.

When the first process finishes, the second headstock 205 is moved in the direction of the arrow A'+ (and/or the first headstock 209 is moved in the direction of the arrow D'−) in order that the first headstock 209 and the second headstock 205 may close each other. Then, the workpiece 50a is delivered to the first spindle 210 (the chuck 210a) from the second spindle 206 (the chuck 206a).

The first spindle 210 is rotated and the first headstock 209 is moved in the directions of the arrows D'+ and D'−, and the first tool rest 211 is properly moved in the directions of the arrows F'+ and F'− so as to perform the second process of machining on the workpiece 50a held with first spindle 210.

During the second process of machining on the workpiece 50a on the first spindle 210 side, a new workpiece 50a is cut off the long bar stock 50 by using the second headstock 205 and the second tool rest 207. And, during the second process of machining on the workpiece 50a of the last time on the first spindle 210 side, the first process of machining is performed on the new workpiece 50a on the second spindle 206 side.

Since the effects almost the same as ones of the opposed spindle lathe 1, described hereinbefore, are obtained in the opposed spindle lathe 201, the long bar stocks 50 can be properly machined.

It was mentioned that the first headstock 209 and the first tool rest 211 are moved in case of the second process of machining on the workpiece 50a. However, only the first tool rest 211 may be moved in case of the second process of machining on the workpiece 50a with such an arrangement that the first headstock 209 is fixed and the first tool rest 211 can be moved in two directions.

With respect to the opposed spindle lathe 201, apparatus, dispositions or methods may be properly changed in a similar manner to the various alterations with respect to the opposed spindle lathe 1 (such as the opposed spindle lathe 1') described hereinbefore.

It was mentioned in the above-mentioned embodiment that the second headstocks 7, 205 each holding the bar stock 50 at the time of sawing of the bar stock 50 are provided being free to move approaching and isolating from the bar suppliers 20, 120. However, the headstock holding the bar supplier 50 at the time of sawing may not move.

Figure 21:
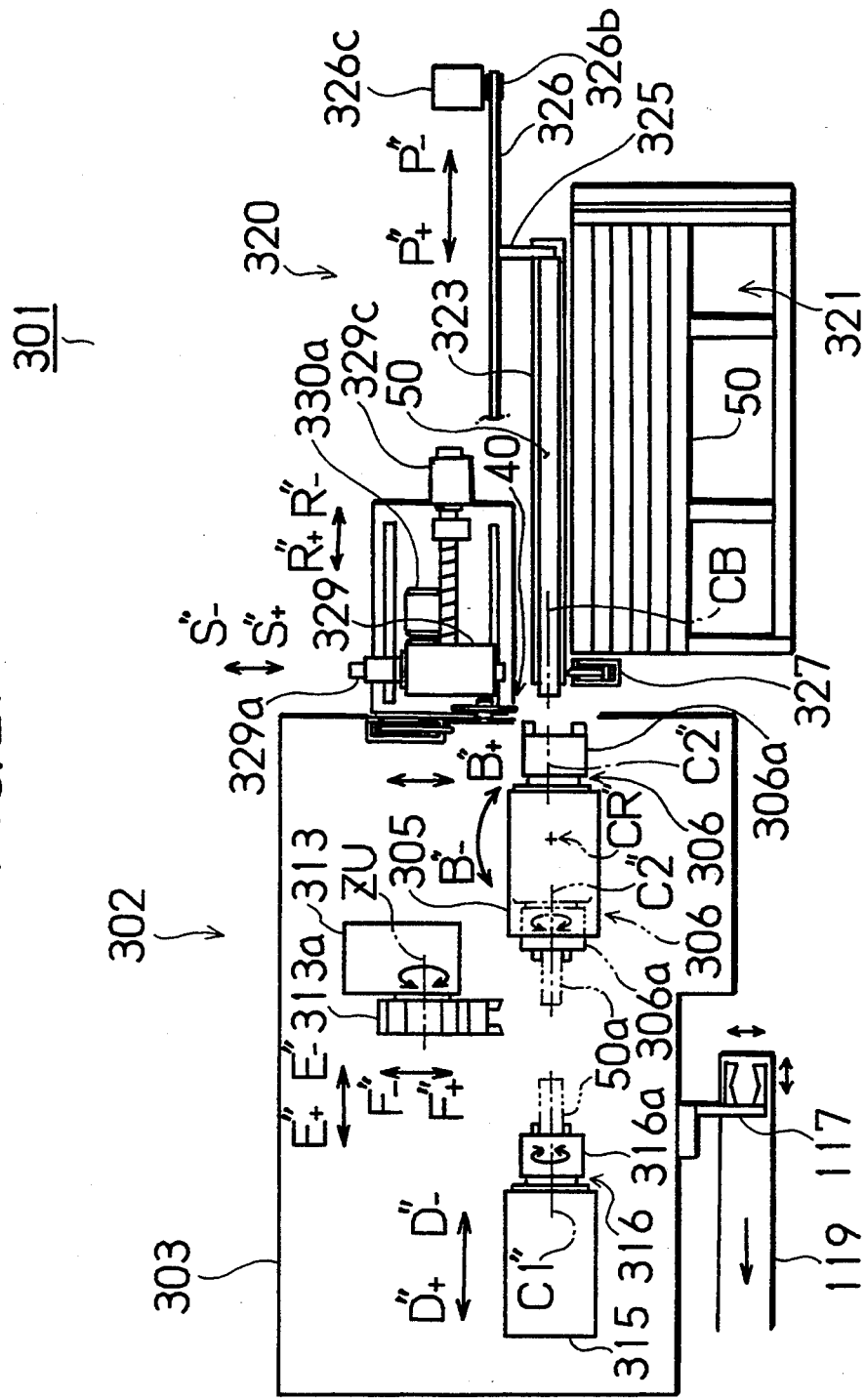
FIG. 21 is a top view showing another embodiment of the numerically controlled machine tool according to the present invention.

An opposed spindle lathe 301 has a main machine 302, as shown in FIG. 21. The main machine 302 is provided with a base 303. At the left portion of the base 303 in the figure, a first headstock 315 is provided being free to move in the directions of the arrows D"+ and D"−. The first headstock 315 is provided with a first spindle 316 being free to rotate on axis C1' parallel to the movement direction of the first headstock 315 (in the directions of the arrows D"+ and D"−). On the front face of the first spindle 316 (the right end in the figure), a chuck 316a is installed.

At the right portion of the base 303 in the figure, a second headstock 305 is provided being free to rotate 180 degrees in the directions of the arrows B"+ and B"− on axis CR" through a similar mechanism to the second headstock 7 of the opposed spindle lathe 1, described hereinbefore. The second headstock 305 can not move. The second headstock 305 is provided with a second spindle 306 being free to rotate on axis C2" selectively corresponding with axis C1' of the first spindle 316 or axis CB of the bar stock 50 put on a guide rail 323 of a bar supplier 320, described hereinafter, by the rotation of the second headstock 305 in the directions of the arrows B"+ and B"−. On the front face of the second spindle 306 a chuck 306a is installed.

Between the first headstock 315 and the second headstock 305 on the base 303, a tool rest 313 is provided being free to move in the directions of the arrows E"+ and E"− parallel to axis C1' of the first spindle 316 and in the directions of the arrows F"+ and F"− perpendicular to axis C1". On the first tool rest 315, a turret 315a is provided being free to rotate on axis ZU parallel to axis C1" of the first spindle 316. On the turret 315a, a plurality of tool installation positions are circumferentially provided on axis ZU so as to index by the rotation of the turret 315a and on each tool installation position, a tool, such as a turning tool or an end mill, is installed.

Near the first headstock 315, the carrying conveyor 119 is provided. And, near the first headstock 315 and the carrying conveyor 119, the unloader 117 is provided.

On the right hand of the main machine 302 in the figure, the bar supplier 320 is provided. The bar supplier 320 is provided with a material shelf 321 for storing many long shaped bar stocks 50, in a similar manner to the material shelf 121 of the bar supplier 120, described hereinbefore. Besides, the guide rail 323 for receiving the bar stocks 50 from the material shelf 321, in a similar manner to the guide rail 123 of the bar supplier 120, described hereinbefore, is provided. The guide rail 323 is disposed so as to correspond axis CB of the bar stock 50 put on the guide rail 323 with axis C2" of the second spindle 306. The left end portion of the guide rail 323 in the figure opens so as to pass the bar stocks 50 through.

The bar supplier 320 is provided with a feeding arm 325 being free to move in the directions of the arrows P"+ and P"− parallel to the guide rail 323 so as to push the bar stock 50 put on the guide rail 323 for a wide range through a sprocket 326b, a motor 326c and a chain 326 having no end. That is, the chain 326 is rotated through the sprocket 326b and the motor 326c and the feeding arm 325 is fixed on the chain 326.

At the left portion of the guide rail 323 of the bar supplier 320 in the figure, a clamp cylinder 327 is provided so as to clamp the bar stock 50 put on the guide rail 323.

On the left upper hand of the guide rail 323 in the figure, a slide 329 is provided being free to move in the directions of the arrows R"+ and R"− parallel to the guide rail 323 and in the directions of the arrows S"+ and S"− perpendicular to the guide rail 323, through motors 329c, 329a. The slide 329 is provided with the saw 40 being free to rotate through a motor 330a.

With the above-described arrangement of the opposed spindle lathe 301, in case of automatic operation, in a similar manner to the bar supplier 120, described hereinbefore, one of the bar stocks 50 is taken out of the material shelf 321 of the bar supplier 320 storing many bar stocks 50 so as to put on the guide rail 323.

As shown with the full line in the figure, the second headstock 305 is rotated 180 degrees in the direction of the arrow B"+ so as to correspond axis C2" of the second spindle 306 with axis CB of the bar stock 50 on the guide rail 323.

Thereafter, the delivery arm 325 is moved in the direction of the arrow P"+ through the motor 326c and the chain 326. Then, the bar stock 50 on the guide rail 323 is moved to the main machine 302 side by being pushed by the feeding arm 325. And, the top end portion of the bar stock 50 (the left end portion in the figure) is inserted into the chuck 306a of the second spindle 306. On this occasion, when workpieces 50a are cut off the bar stock 50, described hereinafter, one by one, the bar stock 50 on the guide rail 323 gradually becomes short. However, the second spindle 306 can be properly supplied with the bar stock 50 which became short from the guide rail 323 since the feeding arm 325 can move in the directions of the arrows P"+ and P"− for wide range through the chain 326. And, the top end portion of the bar stock 50 is clamped with the chuck 306a and the bar stock 50 is fixed with respect to the guide rail 323 through the clamp cylinder 327.

The slide 329 is properly moved in the directions of the arrows R"+ and R"− through the motor 329c so as to position the saw 40 relative to the bar stock 50. Thereafter, the saw 40 is rotated with the motor 330a and the slide 329 is moved in the direction of the arrow S"+ with the motor 329a so as to saw the bar stock 50 clamped with the chuck 306a of the second spindle 306 and the clamp cylinder 327. Then, the workpiece 50a of a predetermined length, cut off the long bar stock 50 is held with the second spindle 306 (the chuck 306a).

After the clamp cylinder 327 is unclamped, the second headstock 305 is rotated 180 degrees in the direction of the arrow B"−, as shown with the two-dot and two short dashes line in the figure, so as to correspond axis C2" of the second spindle 306 with axis C1" of the first spindle 316 and so as to face the workpiece 50a held with the second spindle 306 to the tool on the tool rest 313. On this occasion, rotation of the second headstock 305 correspond to carrying of the workpiece 50a. Thereafter, the second spindle 306 is rotated and the tool rest 313 is properly moved in the directions of the arrows E"+ and E"− and in the directions of the arrows F"+ and F"− so as to perform the first process of machining on the workpiece 50a held with the second spindle 306.

When the first routine of machining on the workpiece 50a finishes on the second spindle 306 side, the first headstock 315 is moved in the direction of the arrow D"− so as to approach the second headstock 305. And, the workpiece 50a is delivered to the first spindle 316 (the chuck 316a) from the second spindle 306 (the chuck 306a).

Thereafter, the first spindle 316 is rotated and the tool rest 313 is properly moved in the directions of the arrows E"+ and E"− and in the directions of the arrows F"+ and F"− so as to perform the second process of machining on the workpiece 50a held with the first spindle 316.

During the second process of machining on the workpiece 50a on the first spindle 316 side, a new workpiece 50a is sawed out of the long bar stock 50 by using second headstock 305.

It was mentioned that the workpiece 50a is delivered from the second spindle 306 to the first spindle 316 by movement of the first headstock 315. However, the delivery may be performed in such a manner that the tool rest 313 is provided with a workpiece clamp and the workpiece 50a is held through the workpiece clamp and the tool rest 313 is moved.

since the similar effects to ones of the opposed spindle lathe 1, described hereinbefore, are obtained in the opposed spindle lathe 301, the long bar stocks 50 can be properly machined. Besides, with respect to the opposed spindle lathe 301, apparatus, dispositions or methods can be properly changed in a similar way to the various alterations with respect to the opposed spindle lathe 1 (such as the opposed spindle lathe 1'), described hereinbefore.

It was mentioned in the embodiment described hereinbefore that the second spindles 15, 206, 306 for holding the bar stock 50 at the time of sawing of the workpiece 50a out of the bar stock 50 are provided on the second headstocks 7, 205, 305. However, the second spindle may be provided on the tool rest.

Figure 22:
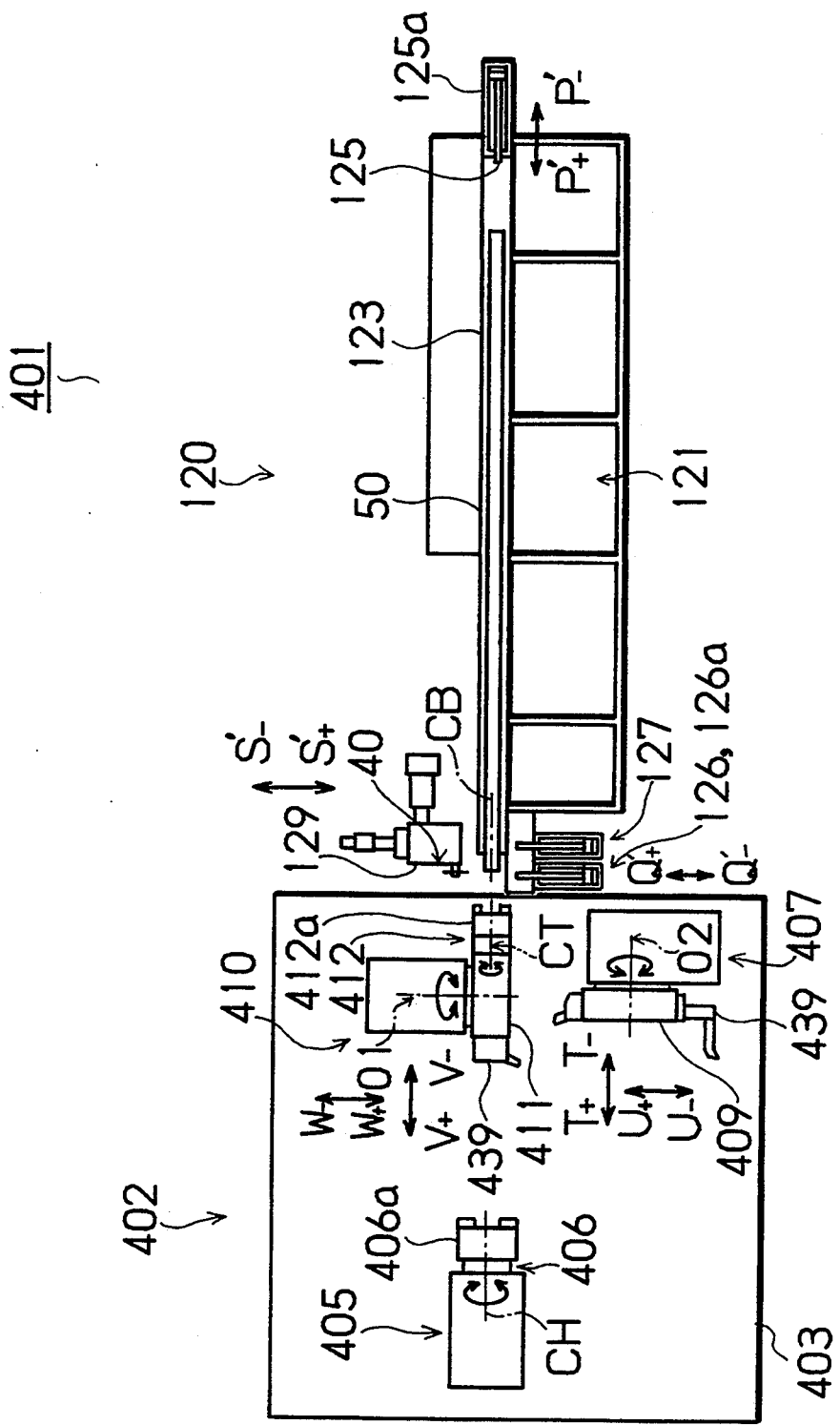
FIG. 22 is a top view showing another embodiment of the numerically controlled machine tool according to the present invention.

As shown in FIG. 22, a quadriaxial lathe 401 has a main machine 402. The main machine 402 is provided with a base 403. At the left portion of the base 403 in the figure, a headstock 405 is fixedly provided. The headstock 405 is provided with a first spindle 406 being free to rotate on axis CH. On the front face of the first spindle 406 (the right end in the figure) a chuck 406a is installed.

On the right upper hand of the headstock 405 on the base 403 in the figure, a first tool rest 410 is provided being free to move in the directions of the arrows V+ and V− parallel to axis CH of the first spindle 406 and in the directions of the arrows W+ and W− perpendicular to axis CH. The first tool rest 410 is provided with a turret 411 being free to rotate on axis O1 perpendicular to axis CH of the first spindle 406 and parallel to the movement direction of the first tool rest 410 (in the directions of the arrows W+ and W−). On the turret 411, a plurality of tool installation positions are circumferentially provided on axis O1 so as to index by the rotation of the turret 411. On one of the tool installation positions, a chuck 412a of a second spindle 412, described hereinafter, is provided being free to rotate. On another tool installation positions, various tools 439, such as a turning tool, an end mill, are installed.

The turret 411 is provided with the second spindle 412 being rotate on axis CT perpendicular to axis O1 of the turret 411. Axis CT of the second spindle 412 is disposed so as to selectively correspond with axis CH of the first spindle 406 or axis CB of the bar stock 50 put on the guide rail 123, described hereinafter, by the rotation of the turret 411. On the front face of the second spindle 412, the chuck 412a is installed.

on the right lower hand of the headstock 405 on the base 403 in the figure, a second tool rest 407 is provided being free to move in the directions of the arrows T+ and T− parallel to axis CH of the first spindle 406 and in the directions of the arrows U+ and U− perpendicular to axis CH.

The second tool rest 407 is provided with a turret 409 being free to rotate on axis O2 parallel to axis CH of the first spindle 406. On the turret 409, a plurality of tool installation positions are circumferentially provided on axis O2 so as to index by the rotation of the turret 409. On each tool installation position, various tools 439, such as a turning tool, are installed.

On the right hand of the main machine 402 in the figure, the bar supplier 120 is provided. The bar supplier 120 is provided with the guide rail 123 so as to correspond axis CB of the bar stock 50 put on the guide rail 123 with axis CT of the second spindle 412 of the main machine 402.

On this occasion, since for the components of the quadriaxial lathe 401, as shown in FIG. 22, the same as ones of the opposed spindle lathe 101, as shown in FIG. 16, such as the bar supplier 120, the same numerals as ones of the opposed spindle lathe 101 are used, the explanation thereof will be omitted.

With the above-described arrangement of the quadriaxial lathe 401, in case of automatic operation, one of the bar stocks 50 is taken out of the material shelf 121 of the bar supplier 120 storing many long bar stocks 50 so as to put on the guide rail 123. Thereafter, the bar stock 50 on the guide rail 123 is projected from the open portion of the left end of the guide rail 123 in the figure through the feeding rod 125 by properly using the stopper 126. The bar stock 50 is fixed on the guide rail 123 through the clamp cylinder 127.

The turret 411 of the first tool rest 410 is properly rotated so as to index the second spindle 412 (the chuck 412a) on the bar supplier 120 side and the first tool rest 410 is properly moved in the directions of the arrows W+ and W−. Then, axis CT of the second spindle 412 is corresponded with axis CB of the bar stock 50 on the guide rail 123. On this occasion, axis CT of the second spindle 412 becomes parallel to the movement direction of the first tool rest 410 (in the directions of the arrows V+ and V−). The first tool rest 410 is moved in the direction of the arrow V− so as to approach the bar supplier 120. The top end portion of the bar stock 50, projecting from the guide rail 123, is clamped by the chuck 412a of the second spindle 412.

After the clamp cylinder 127 is unclamped, the first tool rest 410 is moved a predetermined distance in the direction of the arrow V+ so as to isolate from the bar supplier 120. Then, the bar stock 50 clamped with the chuck 412a of the second spindle 412, is pulled a predetermined length out of the guide rail 123 of the bar supplier 120. Thereafter, the bar stock 50 is fixed by the chuck 412a of the second spindle 412 and the clamp cylinder 127.

The saw 40 is rotated and the slide 129 is moved in the direction of the arrow S'+ so as to saw the bar stock 50 fixed by the chuck 412a of the second spindle 412 and the clamp cylinder 127 with the saw 40. Then, with the second spindle 412 (the chuck 412a) the workpiece 50a of a predetermined length, cut off the long bar stock 50, is held.

The first tool rest 410 is moved in the direction of the arrow V+ so as to isolate from the bar supplier 120. And, the workpiece 50a on the second spindle 412 is moved to the machining area facing the tool 439 on the second tool rest 407. The second spindle 412 is rotated and the turret 409 of the second tool rest 407 is properly rotated so as to index a predetermined tool 439. Thereafter, the second tool rest 407 is properly moved in the directions of the arrows T+ and T− and in the directions of the arrows U+ and U− so as to perform the first process of machining on the workpiece 50a held with the second spindle 412.

When the first process of machining on the workpiece 50a finishes on the second spindle 412 side, the second tool rest 407 is moved in the direction of the arrow T− and in the direction of the arrow U− so as to retreat and isolate from the first tool rest 410. The turret 411 of the first tool rest 410 is rotated 180 degrees so as to index the second spindle 412 (the chuck 412a) and the workpiece 50a on the headstock 405 side. And, the first tool rest 410 is properly moved in the directions of the arrows W+ and W−. Then, axis CT of the second spindle 412 is corresponded with axis CH of the first spindle 406. Thereafter, the first tool rest 410 is moved in the direction of the arrow V+ so as to approach the headstock 405. The workpiece 50a, on which the first process of machining finishes, is delivered to the first spindle 406 (the chuck 406a) from the second spindle 412 (the chuck 412a).

When the delivery of the workpiece 50a finishes, the first tool rest 410 is moved in the direction of the arrow V− so as to isolate from the headstock 405. Thereafter, the first spindle 406 is rotated and the turret 409 of the second tool rest 407 is properly rotated so as to index a predetermined tool 439. And, the second tool rest 407 is properly moved in the directions of the arrows T+ and T− and in the directions of the arrows U+ and U− so as to perform the second process of machining on the workpiece 50a held with the first spindle 406.

During the second process of machining on the workpiece 50a on the first spindle 406 side, a new workpiece 50a is sawed out of the long bar stock 50 by using the first tool rest 410, in a similar manner described hereinbefore. When the sawing of the new workpiece 50a finishes, the first tool rest 410 is moved in the direction of the arrow V+ so as to approach the headstock 405. The turret 411 of the first tool rest 410 is properly rotated so as to index a predetermined tool 439 on the left side in the figure. The first tool rest 410 is properly moved in the directions of the arrows V+ and V− and in the directions of the arrows W+ and W− while the new workpiece 50a is held with the second spindle 412 (the chuck 412a) so as to assist the second process of machining on the workpiece 50a of the last time, held with the first spindle 406.

Since the effects almost the same as ones in the opposed spindle lathe 1, described hereinbefore, are obtained in the quadriaxial lathe 401, the long bar stocks 50 can be properly machined with respect to the quadriaxial lathe 401, apparatus, dispositions or methods may be properly changed in a similar way to various alterations with respect to the opposed spindle lathe 1 (such as, the opposed spindle lathe 1'), described hereinbefore.

It was mentioned in the embodiment described hereinbefore that the guide pocket 27 or the guide rails 123, 323 of the bar suppliers 20, 120, 320 are respectively disposed outside the main machines 2, 202, 302, 402 as a bar stock supporting means and the second headstocks 7, 205, 305 or the first tool rest 410 is disposed inside the main machines 2, 202, 302, 402 as a workpiece delivery means. However, for instance, a workpiece carrying means may be provided outside main machines 503, 603 as opposed spindle lathes 501, 601, described hereinafter.

Figure 23:
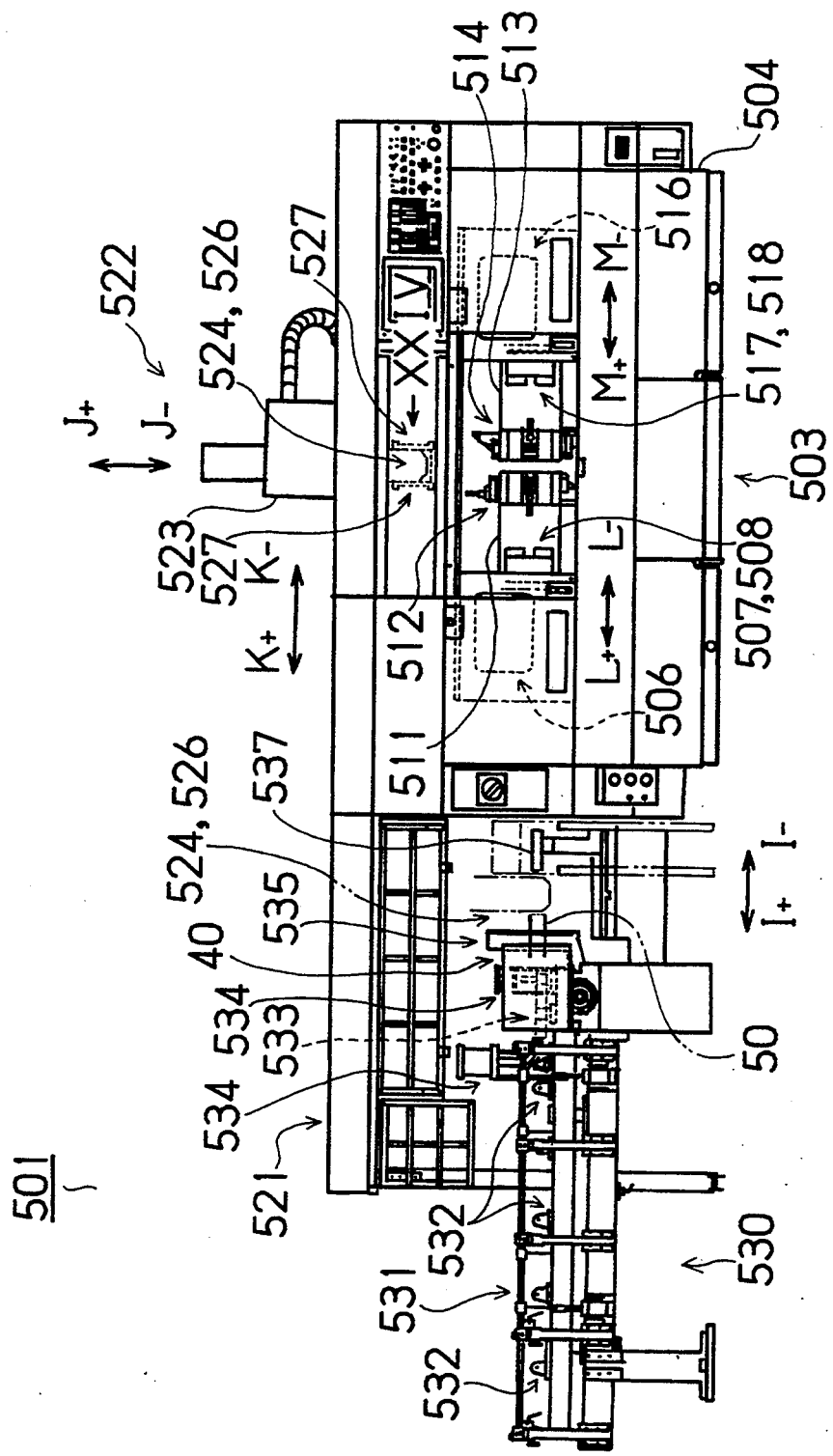
FIG. 23 is a front elevation showing another embodiment of the numerically controlled machine tool according to the present invention.

The opposed spindle lathe 501 has the main machine 503, as shown in FIG. 23. The main machine 503 is provided with a base 504. On the base 504, a first headstock 506 and a second headstock 516 are provided being free to move in the directions of the arrows L+ and L− or in the directions of the arrows M+ and M−, being parallel to each other, respectively so as to approach and isolate from each other. On this occasion, either the first headstock 506 or the second headstock 516 may be fixed on the base 504.

The first headstock 506 is provided with a first spindle 507 being free to rotate on an axis parallel to the movement direction of the headstock 506 (in the directions of the arrows L+ and L−). The second headstock 516 is provided with a second spindle 517 being free to rotate on an axis parallel to the movement direction of the headstock 516 (in the directions of the arrows M+ and M−). The first spindle 507 and the second spindle 517 face each other and are disposed so as to correspond axes thereof with each other. On the first spindle 507 and the second spindle 517, a chuck 508 or a chuck 518 is installed.

On the base 504 of the main machine 503, a first tool rest 511 and a second tool rest 513 is provided being free to move in the direction perpendicular to the movement direction of the headstock 506 or 516, being associated with the first headstock 506 or the second headstock 516. On this occasion, the tool rest 511 or 513 may be also movable in the direction parallel to the movement direction of the headstock 506 or 517. On the tool rest 511 and 513, a turret 512 or 514 is provided being free to rotate on an axis parallel to the movement direction of the headstock 506 or 516. The turret 512 and 514 are circumferentially provided with a plurality of tool installation positions so as to index by the rotation of the turret 512 or 514 and on each tool installation position, a tool, such as a turning tool or an end mill, is installed.

On the left hand of the main machine 503 in the figure, a bar supplier 530 is provided. The bar supplier 530 is provided with a material shelf 531 for storing many long bar stocks 50. A plurality of guide rollers 532 for receiving the bar stock 50 from the material shelf 531 are disposed in a line. On the right hand of the guide roller 532 of the figure, feeding rollers 533 are provided being free to rotate so as to move the bar stock 50 put on the guide rollers 532, which is supplied from the material shelf 531, in the right and left directions in the figure. On the upper hand of the feeding rollers 533 in the figure, press rollers 534, for pressing the bar stock 50 on the feeding rollers 533 to the lower hand in the figure, are provided.

On the right hand of the feeding rollers 533 in the figure, the saw 40 is provided being free to rotate, being free to move in the direction perpendicular to the bar stock 50 on the guide rollers 532. Near the saw 40, two workpiece clamps 535 for clamping the bar stock 50 on the guide rollers 532 at the positions on both right and left sides of the saw 40 in the figure, are provided.

On the right hand of the saw 40 in the figure, a stopper 537 is provided being free to move in the directions of the arrows I+ and I— parallel to the bar stock 50 on the guide roller 532 so as to position the bar stock 50 on the guide rollers 532.

Figure 24:
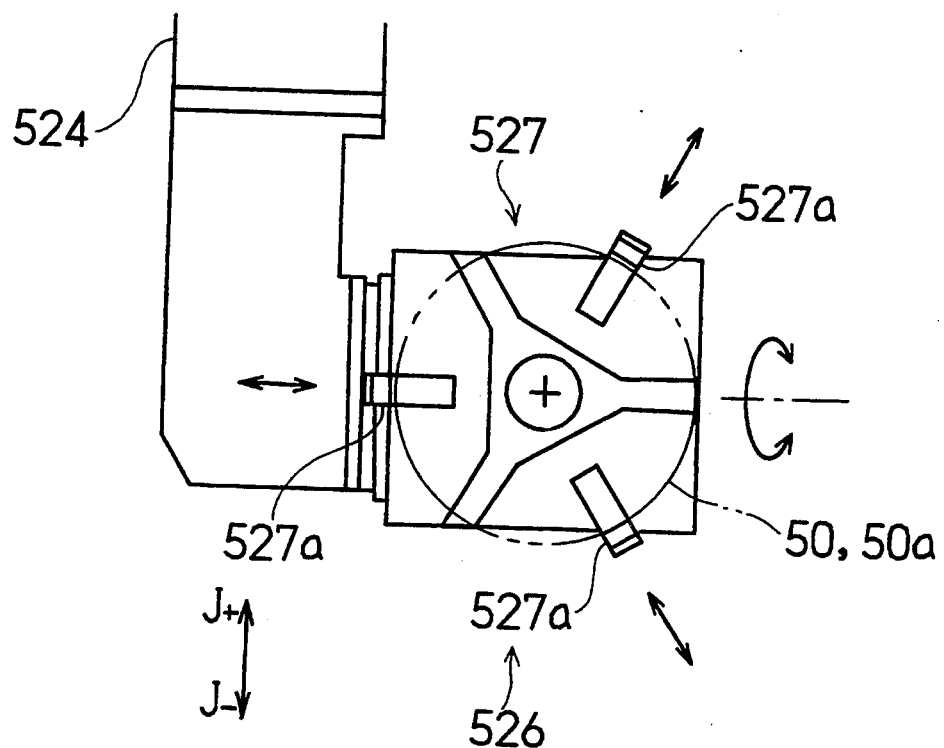
FIG. 24 is a view seen from arrow XXIV of a hand of a gantry robot as shown in FIG. 23.

On the upper hand of the main machine 503 and the bar supplier 530 in the figure, a gantry robot 522 is provided. The gantry robot 522 has a travelling portion 523. The travelling portion 523 is provided being free to move in the directions of the arrows K+ and K— parallel to the bar stock 50 on the guide rollers 532 and axes of the spindles 507, 517 through a rail 521. The travelling portion 523 is provided with an arm 524 being free to lift up and down in the directions of the arrows J+ and J— perpendicular to the movement direction of the travelling portion 523. The arm 524 is provided with a hand 526 so as to correspond with the spindles 507, 517 or the bar stock 50 on the guide roller 532 by lifting the arm 524 up and down. On the hand 526, two chucks 527 are provided being free to rotate and index and as shown in FIG. 24, the chuck 527 is provided with jaws 527a being free to open and close.

With the above-described arrangement of the opposed spindle lathe 501, in case of automatic operation, one of the bar stocks 50 is firstly taken out of the material shelf 531 of the bar supplier 530 storing many bar stocks 50 so as to put on the guide rollers 532. Thereafter, the stopper 537 is properly moved in the directions of the arrows I+ and I— in FIG. 23. And, the bar stock 50 on the guide rollers 532 is moved in the right direction of the figure through the feeding rollers 533 pressing to the feeding roller 534 side through the press rollers 534. Then, the bar stock 50 is positioned by abutting on the stopper 537. On this occasion, the bar stock 50 may be positioned by abutting on the hand 526 of the gantry robot 522. The stopper 537 is retreated in the direction of the arrow I— after positioning of the bar stock 50.

The gantry robot 522 is moved in the direction of the arrow K+ through the travelling portion 523. And, the hand 526 is lowered in the direction of the arrow J— through the arm 524 and moved in the direction of the arrow K+ through the travelling portion 523 so as to clamp the top end portion of the bar stock 50 on the guide rollers 532 with the hand 526. And, the bar stock 50 is fixed through the workpiece clamps 535. On this occasion, the bar stock 50 may be fixed with the hand 526 of the gantry robot 522. Then, the bar stock 50 on the guide rollers 532 is sawed through the saw 40. Then, the workpiece 50a of a predetermined length, sawed out of the long bar stock 50 is held with the hand 526 (the chuck 527) of the gantry robot 522.

Thereafter, the workpiece clamps 535 are unclamped and the hand 526 of the gantry robot 522 is moved in the direction of the arrow K— through the travelling portion 523 and lifted up through the arm 524 in the direction of the arrow J+. The gantry robot 522 is moved in the direction of the arrow K— through the travelling portion 523 so as to carry the workpiece 50a to the main machine 503. The hand 526 of the gantry robot 522 is lowered in the direction of the arrow J— through the arm 524 so as to deliver the workpiece 50a to the chuck 508 of the first spindle 507 from the chuck 527 of the hand 526.

When the main machine 503 is supplied with the workpiece 50a in this way, the first spindle 507 is rotated and the first headstock 506 is properly moved and the first tool rest 511 is properly moved so as to perform the first process of machining on the workpiece 50a held with the chuck 508.

Thereafter, the first headstock 506 is moved in the direction of the arrow L— or the second headstock 516 is moved in the direction of the arrow M+ so as to deliver the workpiece 50a, on which the first process finishes, from the chuck 508 of the first spindle 507 to the chuck 518 of the second spindle 517.

The second process of machining is performed on the workpiece 50a held with the chuck 518 following the first process in such a manner that the second spindle 517 is rotated and the second headstock 516 is properly moved and the second tool rest 513 is properly moved.

During the first or second process of machining on the workpiece 50a in the main machine 503, a new workpiece 50a is sawed out of the bar stock 50 on the guide rollers 532 of the bar supplier 530. The main machine 503 is supplied with the new workpiece 50a by using the gantry robot 522. That is, as a workpiece carrying means the gantry robot 522 outside the main machine 503 is used, whereby the main machine 503 can be properly supplied with the workpieces 50a. Therefore, during the second process of machining on the former workpiece 50a on the second spindle 517 side, the first process of machining on the new workpiece 50a can be performed on the first spindle 507 side.

Since the effects almost the same as ones in the opposed spindle lathe 1, described hereinbefore, are obtained in the opposed spindle lathe 501, the long bar stocks 50 can be properly machined. With respect to the opposed spindle lathe 501, apparatus, dispositions or methods may be properly changed in a similar way to the various alterations with respect to the opposed spindle lathe 1 (such as, the opposed spindle lathe 1'), described hereinbefore.

Figure 25:
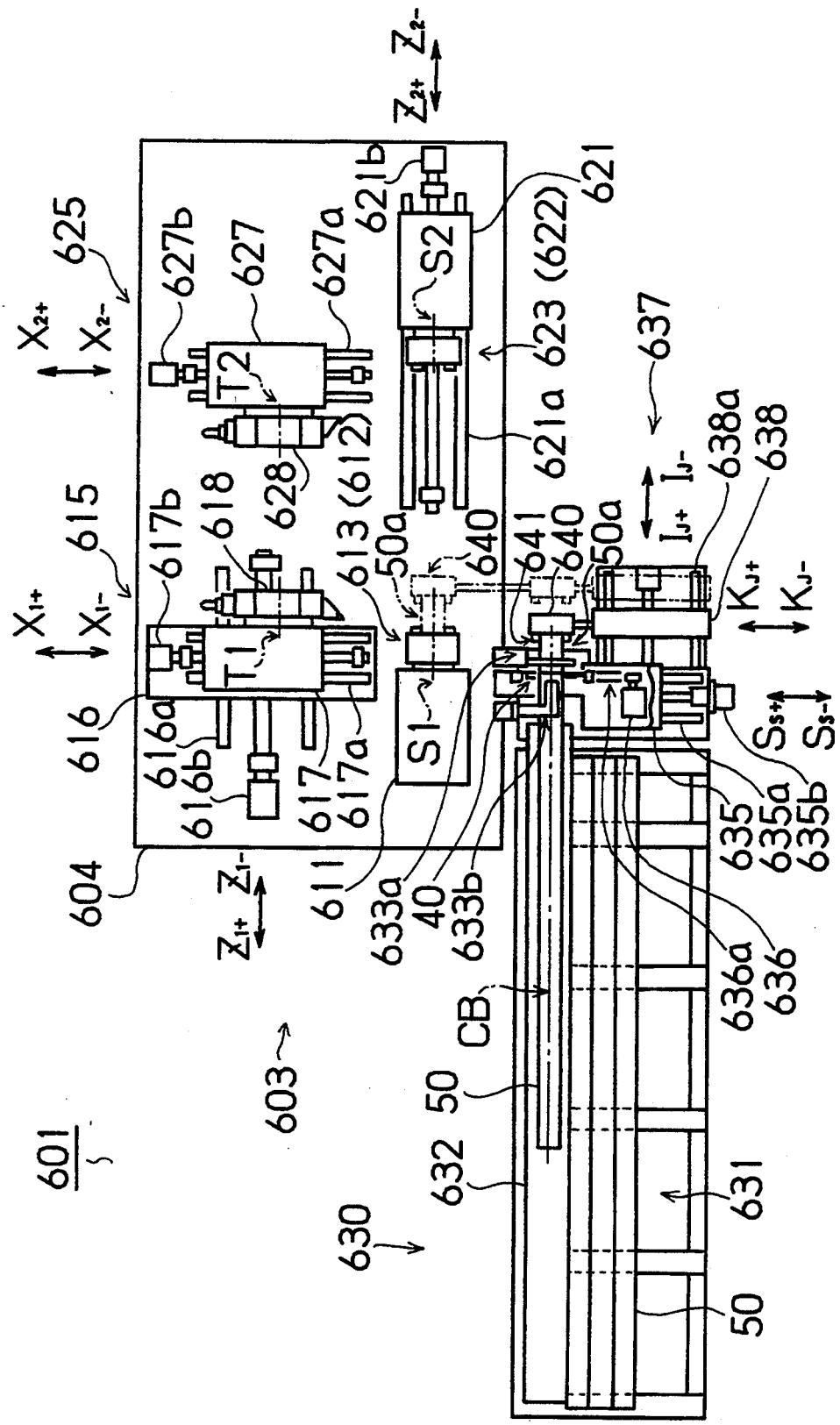
FIG. 25 is a top view showing another embodiment of the numerically controlled machine tool according to the present invention.

As shown in FIG. 25, the opposed spindle lathe 601 has the main machine 603. The main machine 603 is provided with a base 604. On the base 604, a first headstock 611 is fixedly provided. On this occasion, the first headstock 611 may be movable, the same as a second headstock 621, described hereinafter. The first headstock 611 is provided with a first spindle 612 being free to rotate on axis S1. In the first spindle 612, a chuck 613 is installed.

On the base 604, the second headstock 621 is provided being free to move in the directions of the arrows Z2+ and Z2— parallel to axis S1 of the first spindle 612 through guides 621a and a motor 621b so as to approach and isolate from the first headstock 611. The second headstock 621 is provided with a second spindle 622 being free to rotate on axis S2 so as to correspond with axis S1 of the first spindle 612. On the second spindle 622, a chuck 623 is installed.

On the base 604 of the main machine 603, a first tool rest 615 is provided, being associated with the first headstock 611, being free to move in the directions of the arrows Z1+ and Z1− parallel to axis S1 of the first spindle 612 through a carriage 616, guides 616a and a motor 616b, being free to move in the directions of the arrows X1+ and X1− perpendicular to axis S1 of the first spindle 612 through a slide 617, guides 617a and a motor 617b. The slide 617 is provided with a turret 618 being free to rotate on axis T1 parallel to axis S1 of the first spindle 612. On the turret 618, a plurality of tool installation positions are circumferentially provided so as to index by the rotatin of the turret 618. On each of the tool installation positions, a tool, such as a turning tool or an end mill, is installed.

On the base 604, a second tool rest 625 is provided being free to move in the directions of the arrows X2+ and X2− perpendicular to axis S2 of the second spindle 622 through a slide 627, guides 627a and a motor 627b so as to associate with the second headstock 621. The slide 627 is provided with a turret 628 being free to rotate on axis T2 parallel to axis S2 of the second spindle 622. On the turret 628, a plurality of tool installation positions are circumferentially provided so as to index by the rotation of the turret 628 and on each of the tool installation positions, a tool, such as a turning tool or an end mill, is installed.

On the front hand (the lower hand in the figure) of the main machine 603 a bar supplier 630 is provided. The bar supplier 630 is provided with a material shelf 631 for storing many long bar stocks 50. And, a guide rail 632 for receiving the bar stocks 50 from the material shelf 631 is provided. The guide rail 632 is disposed such that axis CB of the bar stock 50 put on the guide rail 632 is parallel to axis S1 of the first spindle 612. The bar supplier 630 is provided with feeding rollers (not shown) for moving the bar stock 50 put on the guide rail 632, supplied from the material shelf 631, in the right and left directions in the figure.

On the right hand of the guide rail 632 in the figure, a slide 635 is provided being free to move in the directions of the arrows Ss+ and Ss− perpendicular to axis CB of the bar stock 50 on the guide rail 632 through guides 635a and a motor 635b. The slide 635 is provided with the saw 40 being free to rotate through a motor 636 and a belt 636a. On this occasion, in the saw 40 of the bar supplier 630, teeth are provided inside a circularring plate, that is, the main body. Near the saw 40, clampers 633a, 633b for clamping the bar stock 50 on the guide rail 632 at the positions on both right and left sides of the saw 40 in the figure, are provided.

On the right hand of the saw 40 in the figure, a handling robot 637 is provided being free to move in the directions of the arrows IJ+ and IJ− parallel to axis CB of the bar stock 50 on the guide rail 632 through a carriage 638, guides 638a and a motor. The carriage 638 is provided with a hand 640 being free to move in the directions of the arrows KJ+ and KJ− perpendicular to axis S1 of the first spindle 612 and axis CB of the bar stock 50 on the guide rail 632, through a cylinder, so as to selectively correspond with the first spindle 612 or the bar stock 50 on the guide rail 632. On the left portion of the hand 640 in the figure, a chuck 641 is installed facing guide rail 632 or the first spindle 612.

With the above-described arrangement of the opposed spindle lathe 601, in case of automatic operation, one of the bar stocks 50 is taken out of the material shelf 631 of the bar supplier 630 storing many bar stocks 50 so as to put on the guide rail 632. The hand 640 of the handling robot 637 is moved in the direction of the arrow KJ− so as to correspond with the bar stock 50 on the guide rail 632 and to properly move in the directions of the arrows IJ+ and IJ−. Thereafter, the bar stock 50 on the guide rail 632 is moved in the right direction in the figure through feeding rollers and is abutted on the hand 640 of the handling robot 637 so as to position.

The top end portion of the bar stock 50 on the guide rail 632 is clamped with the chuck 641 of the hand 640 of the handling robot 637. Besides, the bar stock 50 is fixed with the clampers 633a, 633b. The saw 40 is rotated, and moved in the directions of the arrows Ss+ and Ss− so as to saw the bar stock 50 on the guide rail 632. Then, the workpiece 50a of a predetermined length, sawed out of the long bar stock 50, is held with the hand 640 (the chuck 641) of the handling robot 637.

Thereafter, the clampers 633a, 633b are unclamped and the hand 640 of the handling robot 637 is moved in the direction of the arrow IJ−, and moved in the direction of the arrow KJ+ so as to correspond with the first spindle 612. Then the hand 640 is moved in the direction of the arrow IJ+ so as to deliver the workpiece 50a to the chuck 613 of the first spindle 612 from the chuck 641 of the hand 640.

When the main machine 603 is supplied with the workpiece 50a in this way, the first spindle 612 is rotated and the first tool rest 615 is properly moved so as to perform the first process of machining on the workpiece 50a held with the chuck 613.

Thereafter, the second headstock 621 is moved in the direction of the arrow Z2+, whereby the workpiece 50a, on which the first process finishes, is delivered to the chuck 623 of the second spindle 622 from the chuck 613 of the first spindle 612.

The second spindle 622 is rotated and the second headstock 621 is properly moved, and the second tool rest 625 is properly moved so as to perform the second process of machining on the workpiece 50a held with the chuck 623, following the first process.

During the first or second process of machining on the workpiece 50a in the main machine 603, a new workpiece 50a is sawed out of the bar stock 50 on the guide rail 632 of the bar supplier 630. And, the main machine 603 is supplied with the new workpiece 50a by using the handling robot 637. That is, the handling robot 637 outside the main machine 603 is used as a workpiece carrying means, whereby the main machine 603 can be properly supplied with the workpieces 50a. Besides, during the second process of machining on the former workpiece 50a on the second spindle 622 side, first process of machining on the new workpiece 50a can be performed on the first spindle 612 side.

Since in the opposed spindle lathe 601 the bar supplier 630 and the handling robot 637 are disposed on the front hand of the main machine 603, small floor space can be utilized for the arrangement thereof. Besides, working efficiency increases since a worker is easy to access a machining point.

Since the effects almost the same as ones in the opposed spindle lathe 1, described hereinbefore, are obtained in the opposed spindle lathe 601, the long bar stocks 50 can be properly machined. Beside, with respect to the opposed spindle lathe 601, apparatus, dispositions or methods can be properly changed in a similar way to the various alterations with respect to the opposed spindle lathe 1, described hereinbefore (such as, the opposed spindle lathe 1').

The present invention has been explained on the basis of the embodiments presented herein. However, the embodiments which are discribed in the present specification are illustrative and not limiting. The scope of the invention is designated by the accompanying claims and is not restricted by the description of the specific embodiments. Accordingly, all the transformations and changes belonging to the claims are included in the scope of the present invention.

I claim:

1. A numerically controlled machine tool having a frame, a headstock on said frame, a spindle being rotatable on said headstock, workpiece gripping means on said spindle for gripping a workpiece which is cut from bar stock, and a tool rest on said frame positionable to face the workpiece while gripped by said workpiece gripping means, the numerically controlled machine tool machining the workpiece by relative movement of said headstock and said tool rest, said numerically controlled machine tool further comprising:

at least one bar stock supporting means for movably supporting the bar stock in a predetermined feeding direction, said bar stock supporting means disposed spaced from said headstock and spindle, the bar stock supporting means having a feeding-direction side and being disposed at predetermined positions with respect to said spindle;

a cutting means that includes a saw blade for cutting the bar stock while supported by said bar stock supporting means in a cutting position, said cutting means disposed on said feeding-direction side of said bar stock supporting means and spaced from said tool rest; and a workpiece carrying means for delivering the workpiece produced by cutting the bar stock supported in the bar stock supporting means with said cutting means to said workpiece gripping means of said spindle, the workpiece carrying means being movable relative to said headstock.

2. The numerically controlled machine tool as set forth in claim 1, wherein:
   said numerically controlled machine tool has two said headstocks and one said tool rest.

3. The numerically controlled machine tool as set forth in claim 1, wherein:
   said numerically controlled machine tool has two said headstocks and two said tool rests.

4. The numerically controlled machine tool as set forth in claim 3, wherein:
   at least one of said tool rests is provided with said cutting means.

5. The numerically controlled machine tool as set forth in claim 1, wherein:
   said numerically controlled machine tool has one said headstock and two said tool rests; and
   at least one of said tool rests is rotatably provided with a spindle.

6. The numerically controlled machine tool as set forth in claim 1, wherein:
   said workpiece gripping means of said spindle is attachably and detachably provided with a gripping member;

a gripping member exchanging means for exchanging said gripping member of said workpiece gripping means of said spindle; and a plurality of said bar stock supporting means being indexable to a position in alignment with said feeding direction.

7. The numerically controlled machine tool as set forth in claim 6, wherein:
   a length measuring means for measuring a length of a bar stock supported by said bar stock supporting means is provided;
   a data storing means for storing values of length of bar stocks measured by said length measuring means is provided; and
   a data update means for updating a value of length of said bar stock cut, stored in said data storing means, when said bar stock is cut with said cutting means, is provided.

8. The numerically controlled machine tool as set forth in claim 1, wherein:
   said workpiece carrying means can move in a direction perpendicular to a rotational central axis of said spindle in case of delivery of the workpiece produced by cutting of the bar stock with said cutting means.

9. The numerically controlled machine tool as set forth in claim 1, wherein:
   said workpiece carrying means is provided selectively facing said spindle or said bar stock supporting means.

10. The numerically controlled machine tool as set forth in claim 1, wherein:
    said workpiece carrying means is provided with a spindle being free to rotate, selectively facing said spindle of said headstock or said bar stock supporting means; and
    a movement distance control means for controlling movement distance of said workpiece carrying means is provided.

11. A machining method in the numerically controlled machine tool as set forth in claim 10, wherein:
    said spindle of said workpiece carrying means has a workpiece hole;
    said spindle of said workpiece carrying means is faced to said bar stock supporting means;
    a bar stock supported by said bar stock supporting means is held with said spindle of said workpiece carrying means and cut with said cutting means while said bar stock is partially inserted into said workpiece hole, whereby workpieces of a predetermined length are produced;
    said spindle of said workpiece carrying means is faced to said spindle of said headstock;
    said workpiece held with said spindle of said workpiece carrying means partially inserting into said workpiece hole, is held with said spindle of said headstock and said workpiece carrying means and said headstock are relatively moved so as to pull said workpiece out of said workpiece hole; and
    a portion of said workpiece projecting from said workpiece hole is machined with said tool rest.

12. The numerically controlled machine tool as set forth in claim 1, wherein:
    said saw blade is a blade of a circular saw and is driven rotatably.

13. A numerically controlled machine tool having a frame, a headstock on said frame, a spindle being rotatable on said headstock, workpiece gripping means on said spindle for gripping a workpiece cut from bar stock, and a tool rest on said frame positionable to face the workpiece while gripped by said workpiece gripping means, the numerically controlled machine tool machining the workpiece by relative movement of said headstock and said tool rest, said numerically controlled machine tool further comprising:

at least one bar stock supporting means for movably supporting the bar stock in a predetermined feeding direction, said bar stock supporting means disposed spaced from said headstock and spindle, the bar stock supporting means having a feeding-direction side and being disposed at predetermined positions with respect to said spindle;

a cutting means that includes a saw blade for cutting the bar stock while supported by said bar stock supporting means in a cutting position, said cutting means disposed on said feeding-direction side of said bar stock supporting means and spaced from said tool rest; and a workpiece carrying means for receiving the workpiece produced by cutting the bar stock supported in the bar stock supporting means with said cutting means at a position on said feeding-direction side of the bar stock supporting means and for delivering said workpiece to said workpiece gripping means of said spindle, the workpiece carrying means being movable relative to said headstock.

14. The numerically controlled machine tool as set forth in claim 13, wherein:

said saw blade is a blade of a circular saw and is driven rotatably.

15. A numerically controlled machine tool having a frame, a headstock on said frame, a spindle being rotatable on said headstock, workpiece gripping means on said spindle for gripping a workpiece cut from bar stock, and a tool rest on said frame positionable to face the workpiece while gripped by said workpiece gripping means, the numerically controlled machine tool machining the workpiece by relative movement of said headstock and said tool rest, said numerically controlled machine tool further comprising:

at least one bar stock supporting means for movably supporting and moving the bar stock in a predetermined feeding direction, said bar stock supporting means disposed spaced from said headstock and spindle, the bar stock supporting means having a feeding-direction side and being disposed at predetermined positions with respect to said spindle;

a cutting means that includes a saw blade for cutting the bar stock supported by said bar stock supporting means in a cutting position on said feeding-direction side of said bar stock supporting means;

a bar stock holding means for holding the bar stock supported by said bar stock supporting means in a position corresponding to said cutting position in case of cutting of said bar stock with said cutting means; and a workpiece carrying means for delivering the workpiece produced by cutting the bar stock supported in the bar stock supporting means with said cutting means to said workpiece gripping means of said spindle, the workpiece carrying means being movable relative to said headstock.

16. The numerically controlled machine tool as set forth in claim 15, wherein:

said bar stock holding means are movable into a position corresponding to said cutting position in case of cutting and into a position to face said tool rest while holding the workpiece produced by cutting said bar stock in case of machining.

17. The numerically controlled machine tool as set forth in claim 16, further comprising, in combination with said headstock, another headstock, wherein:

said other headstock includes a spindle and workpiece gripping means;

said workpiece carrying means is said other headstock; and, said bar stock holding means comprises the workpiece gripping means of said other headstock;

wherein the workpiece carrying means is operative to transfer the workpiece held by said bar stock carrying means between the respective workpiece gripping means.

18. The numerically controlled machine tool as set forth in claim 15, wherein:

said saw blade is a blade of a circular saw and is driven rotatably.

19. A numerically controlled machine tool having a frame, a headstock on said frame, a spindle being rotatable on said headstock, workpiece gripping means on said spindle for gripping a workpiece cut from bar stock, and a tool rest on said frame positionable to face the workpiece while gripped by said workpiece gripping means, the numerically controlled machine tool machining the workpiece by relative movement of said headstock and said tool rest, said numerically controlled machine tool further comprising:

a bar stock storing means for storing a plurality of bar stocks;

at least one bar stock supporting means for movably supporting a one of the plurality of bar stocks stored with said bar stock storing means in a predetermined feeding direction, said bar stock supporting means disposed spaced from said headstock and spindle, the bar stock supporting means having a feeding-direction side and being disposed at predetermined positions with respect to said spindle;

a cutting means that includes a saw blade for cutting the one bar stock supported by said bar stock supporting means in a cutting position on said feeding-direction side of said bar stock supporting means; and a workpiece carrying means for delivering the workpiece produced by cutting the one bar stock supported in the bar stock supporting means with said cutting means to said workpiece gripping means of said spindle, the workpiece carrying means being movable relative to said headstock.

20. The numerically controlled machine tool as set forth in claim 19, wherein:

said saw blade is a blade of a circular saw and is driven rotatably.

* * * * *